United States Patent [19]
Rice

[11] Patent Number: 5,953,016
[45] Date of Patent: Sep. 14, 1999

[54] GRAPHICAL IMAGE MAPPING USING PARTITIONED OPERATIONS

[75] Inventor: Daniel S. Rice, Oakland, Calif.

[73] Assignee: Sun Microsystems, Inc., Palo Alto, Calif.

[21] Appl. No.: 08/676,576

[22] Filed: Jul. 1, 1996

[51] Int. Cl.⁶ .................................................. G06T 11/00
[52] U.S. Cl. ........................................................... 345/436
[58] Field of Search ................................... 395/129–139; 345/429–439

[56] References Cited

U.S. PATENT DOCUMENTS

| | | | |
|---|---|---|---|
| 5,228,126 | 7/1993 | Marianetti, II | 395/162 |
| 5,384,912 | 1/1995 | Ogrinc et al. | 395/164 |

*Primary Examiner*—Almis R. Jankus
*Attorney, Agent, or Firm*—James D. Ivey

[57] ABSTRACT

Mapping of pixels of a graphical object to a destination graphical image buffer is achieved by precalculating relative weights of object pixels near a subject pixel and storing the precalculated relative weights in a table and by determining weights of specific object pixels during processing by a table lookup of the predetermined weights according to a fractional portion of an object pixel address. A partitioned coefficient, which represents the relative weights of two or more object pixels, is retrieved from the weight table and used in a partitioned multiplication operation in a processor to weight each of the two or more object pixels substantially simultaneously. Weights associated with two or more object pixels are formed by partitioned multiplication of a partitioned horizontal weight word and a partitioned vertical weight word. The partitioned horizontal weight word is retrieved from a table of precalculated partitioned horizontal weight words according to fractional portion of a horizontal component of the object pixel address. Similarly, the partitioned vertical weight word is retrieved from a table of precalculated partitioned vertical weight words according to fractional portion of a vertical component of the object pixel address. In addition, partitioned processing operations are used to map multiple pixels of a graphical object to a destination graphical image buffer substantially simultaneously. Multiple partitioned data words, each of which represents multiple components of a respective mapped pixel, are transposed such that each partitioned data word includes a component of each of the mapped pixels and the transposed partitioned data words are summed in a partitioned addition operation. Accordingly, components of multiple mapped pixels are accumulated substantially simultaneously to form the multiple mapped pixels substantially simultaneously.

21 Claims, 25 Drawing Sheets

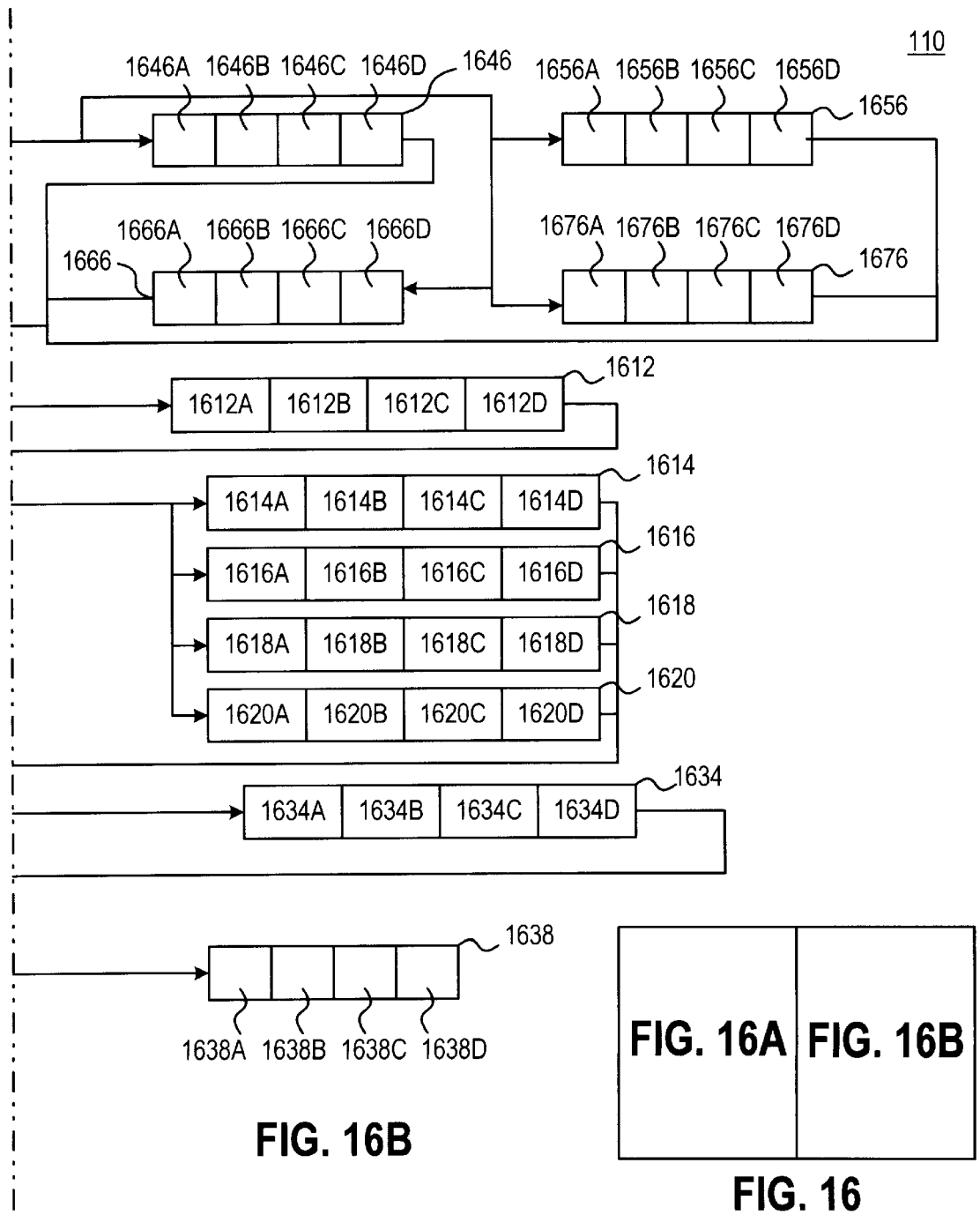

GRAPHICAL IMAGE MAPPING USING PARTITIONED OPERATIONS

FIELD OF THE INVENTION

The present invention relates to graphical image processing in a computer system and, in particular, to a particularly efficient mechanism for mapping a graphical image to display coordinates after rotation, scaling, and/or translation.

BACKGROUND OF THE INVENTION

In rendering graphical objects using a computer system, graphical objects are frequently rotated, scaled, and/or translated prior to being rendered. The following example is illustrative. Suppose that a computer is used to render a poster, which has a graphical image on its front surface and which is affixed to a wall in a three-dimensional space. The graphical image of the poster is defined by a bit-mapped image, i.e., a rectangular grid of pixels. A pixel is an element of the picture, i.e., of the rendering in a computer display device, of a graphical object and has a single color. When rendering in a three-dimensional projected view of the wall and therefore the poster affixed to the wall, the pixels of the graphical image of the poster are mapped to display coordinates such that the poster is rendered to appear in the projected appearance of the wall to which the poster is affixed. Rendering the poster in the three dimensional projection of the wall generally involves rotation, scaling and/or translation of the graphical image of the poster.

Such mapping typically requires substantial resources. Mapping a rotated, scaled or translated graphical image to display coordinates typically involves misaligned pixels. For example, after rotation, scaling, and/or translation, pixels of the graphical image of the poster frequently have coordinates which are not coincident in the display coordinate space with physical pixels of a computer display device in which the poster as rotated, scaled, and/or translated is displayed.

To display the graphical image of the poster, the particular color of a physical pixel of the computer display device is set according to one or more pixels of the graphical image of the poster which are near the physical pixel in the display coordinate space. In some conventional image processing systems, the color of the object pixel nearest the physical pixel is selected. As used herein, an object pixel is a pixel which defines a portion of a graphical object to be displayed. In the context of the illustrative example of the poster affixed to a wall defined in a three-dimensional space, the pixels which define the graphical image of the poster are object pixels. Mapping an object pixel to a physical pixel in this manner frequently results in undesirable effects in the rendering of a graphical object. It is usually preferred to interpolate a color between the colors of the object pixels nearest the physical pixel. Mapping an interpolated object pixel to the physical pixel and displaying as the physical pixel the color of the interpolated object pixel generally achieves a smooth, visually pleasing, desirable result.

In conventional mapping using bilinear interpolation, the proximity of a physical pixel to each of the nearest four object pixels is determined, and the weighted average of the colors of the four nearest object pixels is determined, based on the relative proximity of each of the object pixels to the physical pixel. The relative proximity of each of the object pixels to a particular physical pixel is calculated by (i) determining the distance between each of the object pixels and the physical pixel along coordinate axes, (ii) scaling the determined distances to produce respective weights for the object pixels, (iii) multiplying each component of the color of each object pixel by the respective weight of the object pixel, and (iv) summing the weighted components of the colors to form a weighted average color. Scaling each of the determined distances typically involves several arithmetic operations, requiring substantial computing resources.

For example, calculation of complementary weights for two object pixels near a physical pixel generally requires two distance calculations (each typically involving at least a substraction operation), and a separate multiplication operation for each distance calculation. These operations are required for deriving a weighted average of only two object pixels in a single dimension. Typically, a weighted average of four object pixels in two dimensions is calculated to form the color of the physical pixel. The operations required to calculate the color of the physical pixel represent a substantial component of the resources required to map a graphical image to physical pixels of a computer display device.

Because of the substantial resources required in mapping a graphical object to physical pixels, a need for ever increasingly efficient mechanisms for such mapping persists in the industry.

SUMMARY OF THE INVENTION

In accordance with the present invention, relative weights of object pixels near a subject pixel are precalculated and stored in a table and are determined during processing of object pixels by a table lookup of the predetermined weights according to a fractional portion of an object pixel address. A partitioned coefficient, which represents the relative weights of two or more object pixels, is retrieved from the weight table and used in a partitioned multiplication operation in a processor to weight each of the two or more object pixels substantially simultaneously.

Further in accordance with the present invention, weights associated with two or more object pixels are formed by partitioned multiplication of a partitioned horizontal weight word and a partitioned vertical weight word. The partitioned horizontal weight word is retrieved from a table of precalculated partitioned horizontal weight words according to fractional portion of a horizontal component of the object pixel address. Similarly, the partitioned vertical weight word is retrieved from a table of precalculated partitioned vertical weight words according to fractional portion of a vertical component of the object pixel address. By retrieving vertical and horizontal weights from respective weight word tables, substantial memory resources are saved. In particular, memory required to store the vertical and horizontal weight word tables is substantially less than that required to store a single table which includes precalculated weight words for each possible combination of fractional portions of the vertical and horizontal portions of the object pixel address.

Since weights associated with object pixels are retrieved from tables of precalculated weights, significantly less processing resources are required to map a graphical object to a destination graphical image buffer. In addition, partitioned processing operations are used to map multiple pixels of a graphical object to a destination graphical image buffer substantially simultaneously. Further in accordance with the present invention, multiple partitioned data words, each of which represents multiple components of a respective mapped pixel, are transposed such that each partitioned data word includes a component of each of the mapped pixels and the transposed partitioned data words are summed in a partitioned addition operation. Accordingly, components of multiple mapped pixels are accumulated substantially simultaneously to form the multiple mapped pixels substantially simultaneously.

DETAILED DESCRIPTION

Figure 1:
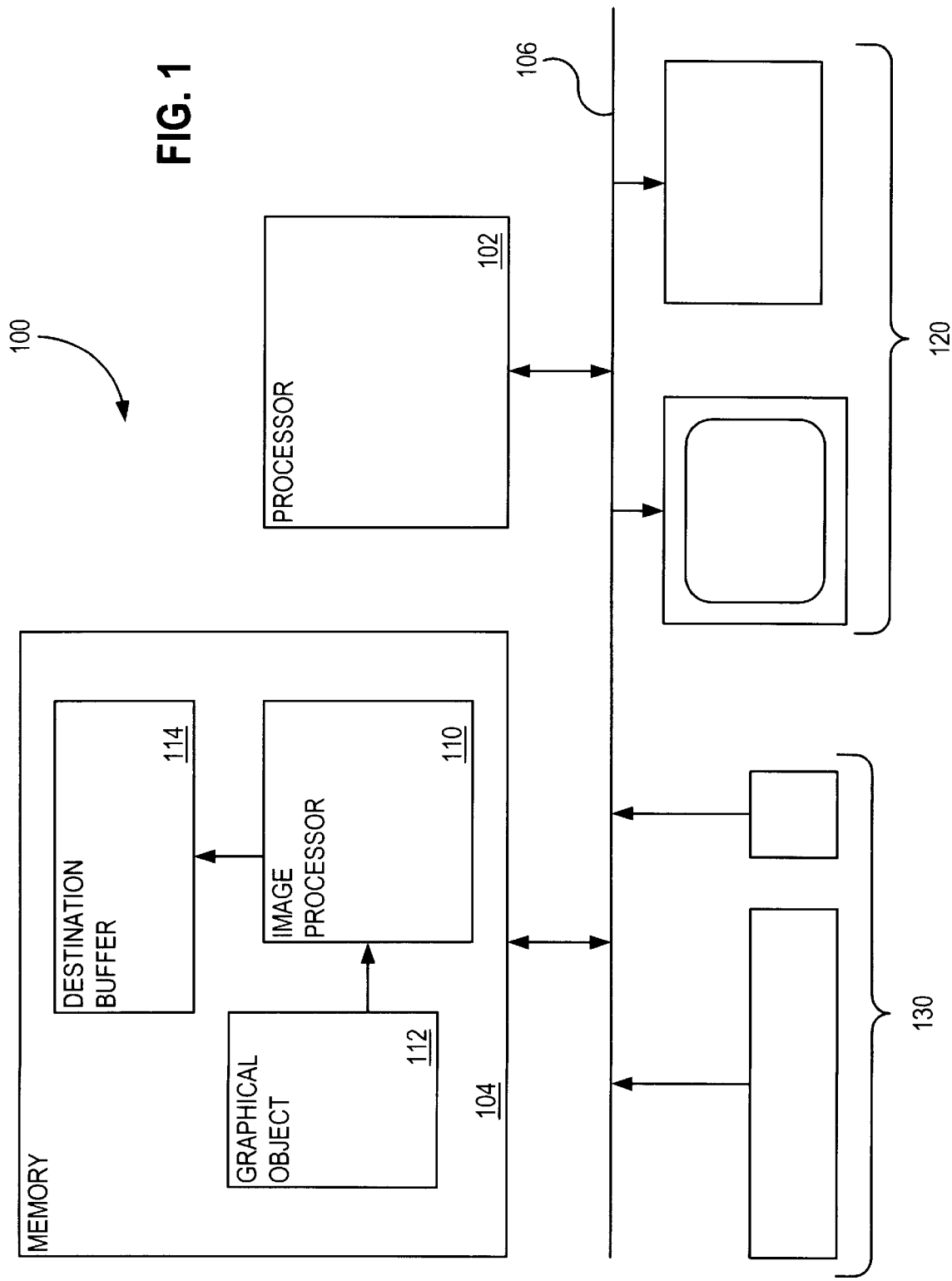
FIG. 1 is a block diagram of a computer system which maps pixels of a graphical object to a destination graphical image buffer in accordance with the present invention.

In accordance with the present invention, relative weights of object pixels near a subject pixel are determined by a table lookup of predetermined weights according to an integer which represents a fractional portion of an object address. A partitioned coefficient, which represents the relative weights of two or more object pixels, is retrieved from the weight table and used in a partitioned multiplication operation in a processor to weight each of the two or more object pixels substantially simultaneously.

Hardware Components of the Image Processing System

To facilitate appreciation of the present invention, the hardware components of the texture mapping system are briefly described. Computer system 100 (FIG. 1) includes a processor 102 and memory 104 which is coupled to processor 102 through a bus 106. Processor 102 fetches from memory 104 computer instructions and executes the fetched computer instructions. Processor 102 also reads data from and writes data to memory 104 and sends data and control signals through bus 106 to one or more computer display devices 120 in accordance with fetched and executed computer instructions. Processor 102 is described in greater detail below.

Memory 104 can include any type of computer memory and can include, without limitation, randomly accessible memory (RAM, read-only memory (ROM), and storage devices which include storage media such as magnetic and/or optical disks. Memory 104 includes an image processor 110, which is a computer process executing within processor 102 from memory 104. A computer process is a collection of computer instructions and data which collectively define a task performed by computer system 100. As described more completely below, image processor 110 (i) reads from a graphical object 112, which is stored in memory 104, (ii) creates from graphical object 112 a transformed graphical image of graphical object 112, and (iii) stores the transformed graphical image in a destination buffer 114 in memory 104.

Destination buffer 114 can be any graphical image buffer used in graphical image processing. For example, destination buffer 114 can be a Z buffer which is used in a conventional manner to remove hidden surfaces from a rendered graphical image. Alternatively, destination buffer 114 can be a frame buffer whose contents are immediately displayed in one of computer display devices 120. Each of computer display devices 120 can be any type of computer display device including without limitation a printer, a cathode ray tube (CRT), a light-emitting diode (LED) display, or a liquid crystal display (LCD). Each of computer display devices 120 receives from processor 102 control signals and data and, in response to such control signals, displays the received data. Computer display devices 120, and the control thereof by processor 102, are conventional.

Bilinear Mapping of Single-Band Objects

In a first embodiment, graphical object 112 has a single band, i.e., each pixel of graphical object 112 has a single data component. For example, each pixel of graphical object 112 can be represented by a single byte of data. The single data component of a particular pixel can represent a particular shade of grey in a greyscale image. Mapping of graphical object 112 to destination buffer 114 by image processor 110 using bilinear interpolation of pixels of graphical object 112 is illustrated in logic flow diagram 200 (FIG. 2). The components of image processor 110 (FIG. 1) which implement the steps of logic flow diagram 200 (FIG. 2) are shown more completely in FIG. 3. Such components are described below in conjunction with the description of logic flow diagram 200 (FIG. 2).

Processing begins in loop step 202 which, in conjunction with next step 212, defines a loop in which four subject pixels are processed. A subject pixel is a pixel of destination buffer 114 in the coordinate space of graphical object 112. Transformation of the coordinates of the subject pixel to the coordinate space of graphical object 112 includes adjustment for any rotation, scaling, and/or translation of the object pixels of graphical object 112 and is conventional. Four subject pixels are processed in the loop defined by loop step 202 and next step 212 to take advantage of the particular capabilities of processor 102 (FIG. 1) which are described more completely below. For each of the four subject pixels, processing transfers from loop step 202 to step 204.

In step 204, image processor 110 (FIG. 3) calculates the coordinates of a subject pixel in the coordinate space of graphical image 112 and stores a horizontal component of the coordinates of the subject pixel in record 302X and stores a vertical component of the coordinates in record 302Y. Records 302X and 302Y are directly analogous to one another and the following description of record 302X is also applicable to record 302Y with the exception that record 302X contains data representing the horizontal component of the coordinates of the subject pixel whereas record 302Y contains data representing the vertical component of the coordinates of the subject pixel.

Record 302X includes an integer component 302XA in which data representing the a whole, integer portion of the horizontal component of the coordinates of the subject pixel. The coordinate space of graphical object 112 (FIG. 1), into which the coordinates represented by records 302X and 302Y (FIG. 3) are mapped, is scaled such that object pixels have integer coordinates and have a spacing of one. In other words, adjacent object pixels of graphical object 112 (FIG. 1) have coordinates which differ by one. The remainder of record 302X (FIG. 3) stores data representing a fractional portion of the horizontal component of the coordinates of the subject pixel. The remainder of record 302X is divided into a most significant portion 302XB and a least significant portion 302XC. In this illustrative embodiment, most significant portion 302XB includes four (4) bits and therefore represents the fractional portion of the horizontal component of the coordinates of the subject pixel to the precision of sixteenths. Least significant portion 302XC is generally ignored. While most significant portion 302XB includes four (4) bits and therefore has a precision of sixteenths, it is appreciated that most significant portion 302XB can have more or fewer bits to have other precisions. In an alternative embodiment, most significant portion 302XB has eight bits and therefore represents the fractional portion of the horizontal component of the coordinates of the subject pixel to the precision of thirty-seconds.

Figure 2:
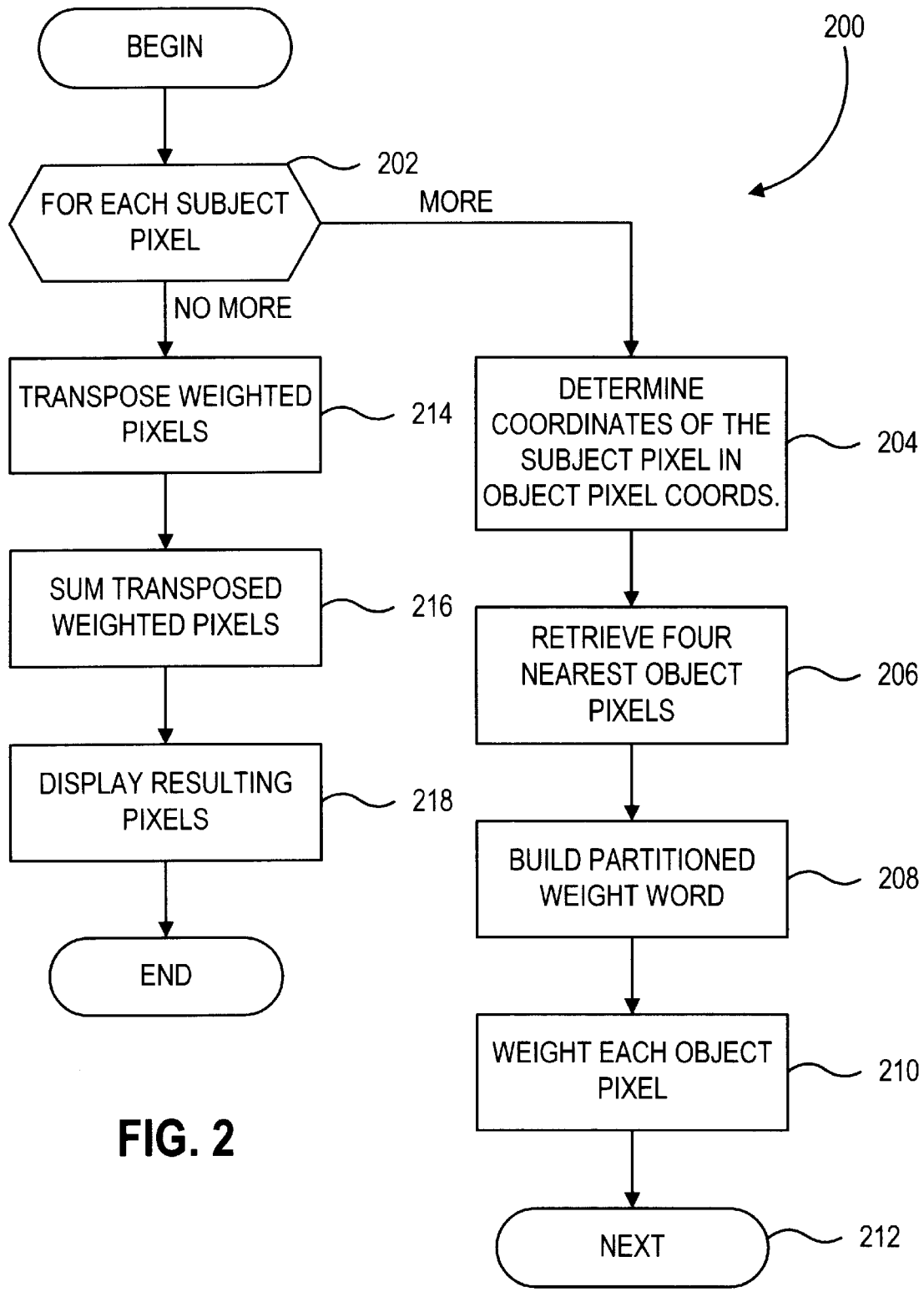
FIG. 2 is a logic flow diagram of the mapping of pixels of a graphical object to a destination graphical image buffer in accordance with the present invention.
Figure 3:
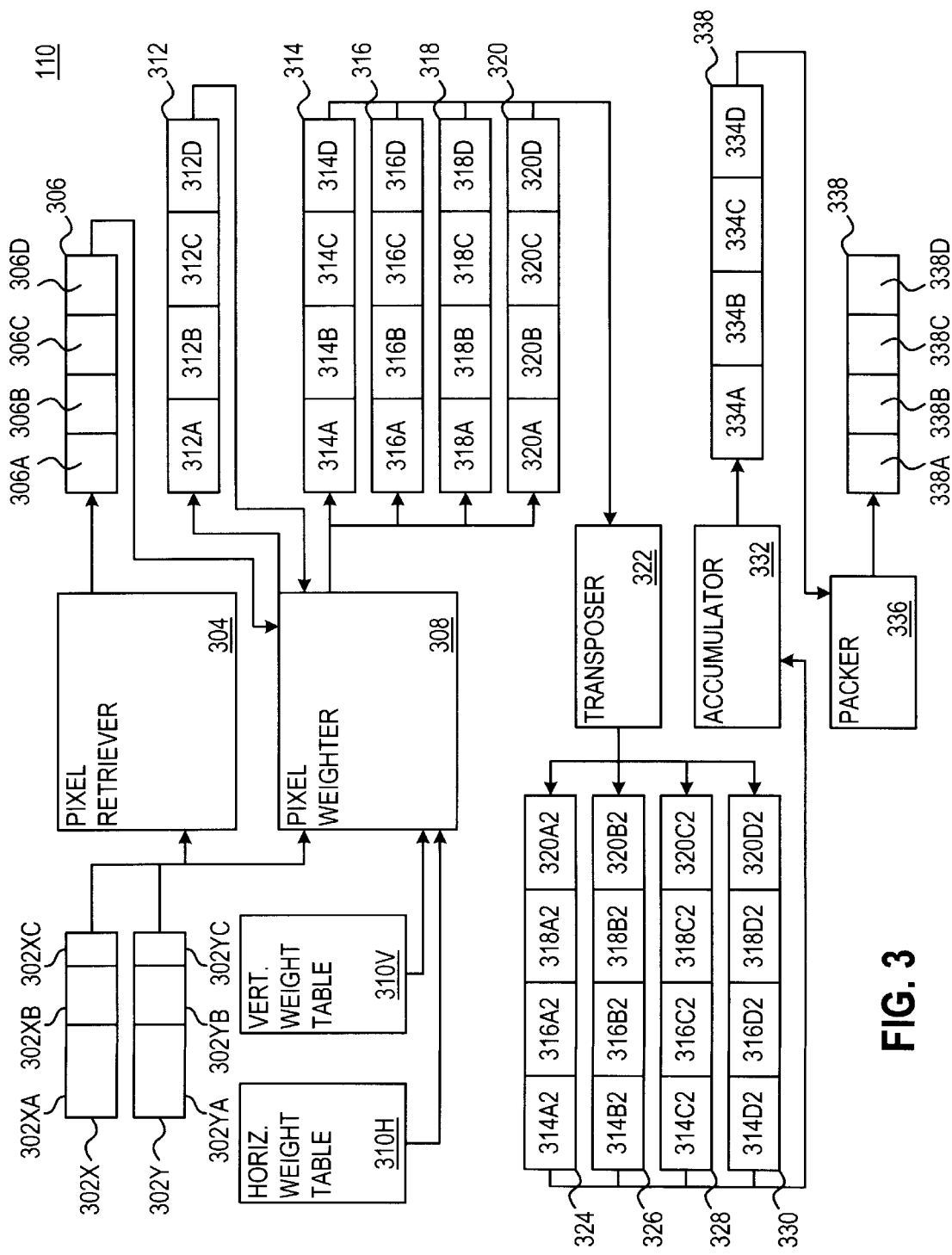
FIG. 3 is a block diagram of the image processor of FIG. 1 in greater detail.
Figure 4:
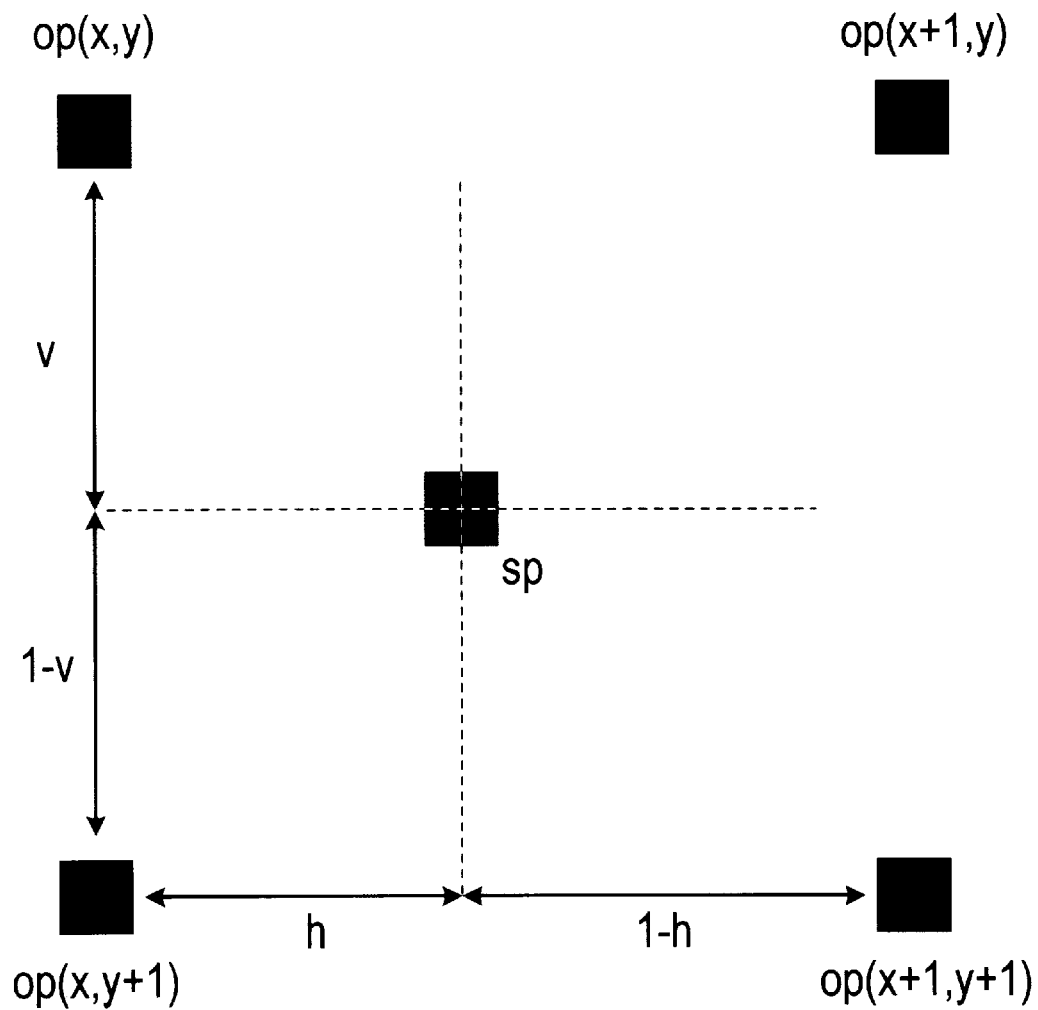
FIG. 4 illustrates the relationship between a pixel of a graphical object and pixels of a destination graphical image buffer.

Processing transfers from step 204 (FIG. 2) to step 206 in which pixel retriever 304 (FIG. 3) of image processor 110 retrieves from graphical object 112 (FIG. 1) four (4) object pixels nearest the subject pixel in the coordinate space of graphical object 112 according to data stored in records 302X and 302Y (FIG. 3). As shown in FIG. 4, graphical object 112 includes four object pixels op(x,y), op(x+1,y), op(x,y+1), and op(x+1,y+1) which are nearest subject pixel sp. Pixel retriever 304 retrieves from graphical object 112 object pixel op(x,y) whose coordinates are specified by integer portion 302XA of record 302X and integer portion of 302YA of record 302Y. Pixel retrieves from graphical object 112 object pixels op(x+1,y), op(x,y+1), and op(x+1,y+1) whose coordinates are respectively (i) integer portion 302XA incremented by one and integer portion 302YA, (ii) integer portion 302XA and integer portion 302YA incremented by one, and (iii) integer portion 302XA incremented by one and integer portion 302YA incremented by one. Pixel retriever 304 stores data representing object pixels op(x,y), op(x+1,y), op(x,y+1), and op(x+1,y+1) in portions 306A, 306B, 306C, and 306D, respectively, of a partitioned pixel word 306. Processing transfers from step 206 (FIG. 2) to step 208. Step 208 is shown in greater detail as logic flow diagram 208 (FIG. 5) in which processing begins in step 502.

In logic flow diagram 208, pixel weighter 308 (FIG. 3) builds a partitioned weight word for weighting each of portions 306A–D of partitioned pixel word 306 according to the proximity of subject pixel sp (FIG. 4) to each of object pixels op(x,y), op(x+1,y), op(x,y+1), and op(x+1,y+1). In implementing bilinear interpolation, image processor 110 maps object pixels op(x,y), op(x+1,y), op(x,y+1), and op(x+1,y+1) to subject pixel sp according to the following equation.

$$sp = op(x+1,y+1) \cdot hv + op(x,y+1) \cdot (1-h)v + op(x+1,y) \cdot h(1-v) + op(x,y) \cdot (1-h)(1-v) \quad (1)$$

In equation (1), h represents the horizontal distance of subject pixel sp from object pixel op(x,y) and is represented by fractional portion 302XB of record 302X. Further in equation (1), v represents the vertical distance of subject pixel sp from object pixel op(x,y) and is represented by fractional portion 302YB of record 302Y. In step 208 (FIG. 2), pixel weighter 308 builds a partitioned weight word 312 which includes four partitioned sixteen-bit fixed point components 312A, 312B, 312C, and 312D whose values are hv, (1–h)v, h(1–v), and (1–h)(1–v), respectively. Calculating these values for each pixel mapped in destination buffer 114 requires considerable computational resources and is therefore undesirable. Conversely, precalculating and storing all possible values for components 312A–D for a desired precision is also impractical. For example, if fractional portions 302XB and 302YB have four bits each, 256 values for partitioned weight word 312 must be precalculated. In most embodiments, processor 102 will not have enough register and cache memory to store so many precalculated values and retrieving such values from memory 104 would decrease performance of image processor 110 beyond acceptable limits. Therefore, pixel weighter 308 builds partitioned weight word 312 according to logic flow diagram 208 in which processing begins in step 502.

Figure 6:
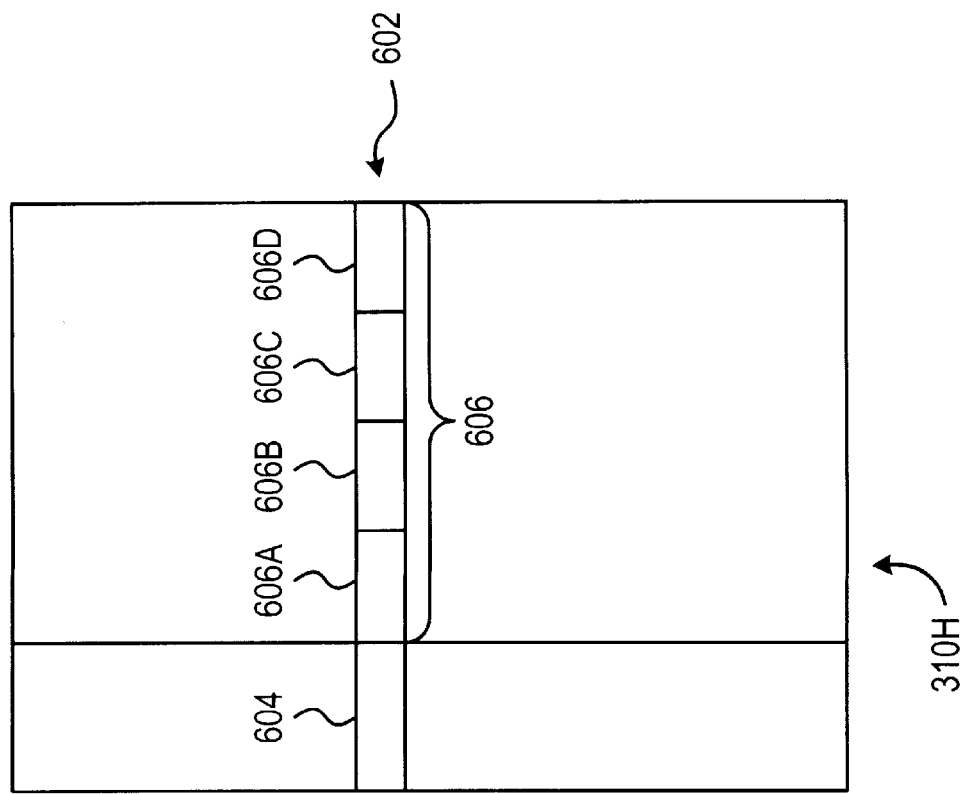
FIG. 6 is a block diagram of a horizontal weight table in accordance with the present invention.

In step 502, pixel weighter 308 retrieves fractional portion 302XB. Processing transfers from step 502 to step 504 in which pixel weighter 308 retrieves a partitioned horizontal weight word from horizontal weight table 310H, which is shown in greater detail in FIG. 6. Horizontal weight table 310H associates a number of predetermined partitioned weight words with corresponding values of fractional portion 302XB (FIG. 3). For example, partitioned weight word 606 (FIG. 6) is associated with data 604 whose value is equal to fractional portion 302XB. Partitioned weight word 606 includes four partitioned sixteen-bit components 606A, 606B, 606C, and 606D whose values are h, 1–h, h, and 1–h, respectively, where h is the distance represented by data 604. Processing transfers from step 504 to step 506.

Figure 7:
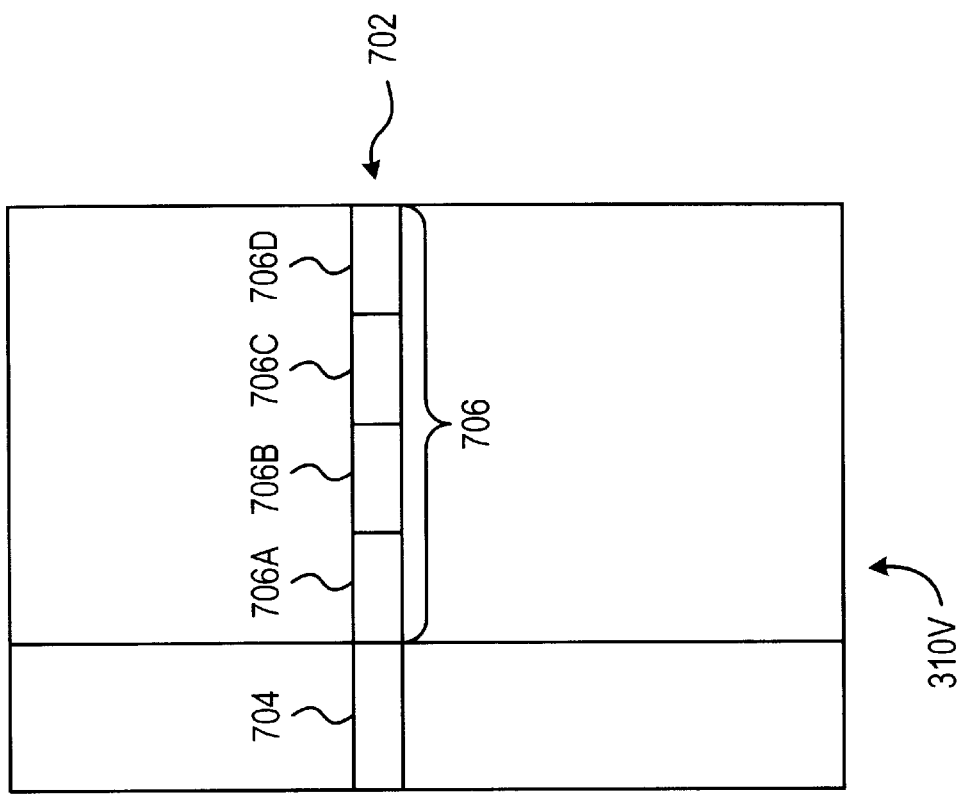
FIG. 7 is a block diagram of a vertical weight table in accordance with the present invention.

In step 506, pixel weighter 308 retrieves fractional portion 302YB. Processing transfers from step 506 to step 508 in which pixel weighter 308 retrieves a partitioned vertical weight word from vertical weight table 310V, which is shown in greater detail in FIG. 7. Vertical weight table 310V associates a number of predetermined partitioned weight words with corresponding values of fractional portion 302YB (FIG. 3). For example, partitioned weight word 706 (FIG. 7) is associated with data 704 whose value is equal to fractional portion 302YB. Partitioned weight word 706 includes four partitioned sixteen-bit components 706A, 706B, 706C, and 706D whose values are v, v, 1−v, and 1−v, respectively, where v is the distance represented by data 704. Processing transfers from step 508 to step 510.

In step 510, pixel weighter 308 multiplies components 606A, 606B, 606C, and 606D of partitioned weight word 606 by components 706A, 706B, 706C, and 706D, respectively, of partitioned weight word 706 to form components 312A, 312B, 312C, and 312D, respectively, of partitioned weight word 312. As a result, components 312A, 312B, 312C, and 312D have the respective values hv, (1−h)v, h(1−v), and (1−h)(1−v). Pixel weighter 308 performs such multiplication of the respective components of partitioned weight words 606 and 706 substantially simultaneously by invoking performance by processor 102 of a partitioned multiplication operation, e.g., the FMUL16×16 operation, which is described more completely below. Thus, partitioned weight word 312 is built by pixel weighter 308 using only two read operations and one partitioned multiplication operation which requires three instruction cycles as described more completely below. In addition, each of horizontal weight table 310H and vertical weight table 310V has sixteen (16) entries since fractional portions 302XB and 302YB are four bits in length and therefore only have sixteen (16) possible values. Thus, pixel weighter 308 builds partitioned weight word 312 from records 302X and 302Y in a particular efficient manner From step 510 (FIG. 5), processing according to logic flow diagram 208, and therefore step 208 (FIG. 2), terminates. From step 208, processing transfers to step 210 in which pixel weighter 308 multiplies each component of partitioned pixel word 306 by a corresponding weight of partitioned weight word 312 to produce partitioned weighted pixel word 314. Specifically, pixel weighter 308 invokes a partitioned multiplication operation, which is described more completely below, in which components 306A, 306B, 306C, and 306D of partitioned weight word 306 are multiplied by components 312A, 312B, 312C, and 312D, respectively, of partitioned weight word 312 to produce components 314A, 314B, 314C, and 314D, respectively, of partitioned weighted pixel word 314. As a result, components 314A, 314B, 314C, and 314D contain data representing the values op(x+1,y+1)·hv, op(x,y+1)·(1−h)v, op(x+1,y)·h(1−v), and op(x,y)·(1−h)(1−v), respectively. Therefore, the sum of components 314A–D is the value of subject pixel sp (FIG. 4).

Processing transfers from step 210 through next step 212 to loop step 202 in which the next of four subject pixels is processed in the manner described above. Processing the second, third, and fourth subject pixels results in weighted pixel values stored in partitioned weighted pixel words 316, 318, and 320, respectively, in a manner that is directly analogous to that described above with respect to partitioned weighted pixel word 314. Once all four subject pixels have been processed according to the loop defined by loop step 202 and next step 212, processing transfers from loop step 202 to step 214.

In step 214, transposer 322 of image processor 110 transposes the components of partitioned weighted pixel words 314, 316, 318, and 320 to take advantage of partitioned arithmetic operations performed by processor 102 (FIG. 1). The result of transposition is four partitioned data words 324, 326, 328, and 330, in each of which (i) the first component is equal to a component of partitioned weighted pixel word 314, (ii) the second component is equal to a component of partitioned weighted pixel word 316, (iii) the third component is equal to a component of partitioned weighted pixel word 318, and (iv) the fourth component is equal to a component of partitioned weighted pixel word 320. Transposer 322 invokes a partitioned merge instruction in a manner described more completely below, to effect the transposition described. Processing transfers from step 214 (FIG. 2) to step 216.

In step 216, accumulator 332 (FIG. 3) of image processor 110 accumulates partitioned data words 324, 326, 328, and 330 into partitioned data word 334. Partitioned data words 324, 326, 328, 330, and 338 each have four partitioned components, each of which is a sixteen-bit fixed point number. Component 338A of partitioned data word 338 is the sum of components 314A, 314B, 314C, and 314D of partitioned data words 324, 326, 328, and 330, respectively. Component 338A therefore represents the value of subject pixel sp (FIG. 4) to which object pixels op(x,y), op(x+1,y), op(x,y+1), and op(x+1,y+1) have been mapped. Similarly, components 338B, 338C, and 338D represent the values of the second, third, and fourth subject pixels processed according to the loop defined by loop step 202 and next step 212 as described above. Specifically, (i) component 338B of partitioned data word 338 is the sum of components 316A, 316B, 316C, and 316D of partitioned data words 324, 326, 328, and 330, respectively; (ii) component 338C of partitioned data word 338 is the sum of components 318A, 318B, 318C, and 318D of partitioned data words 324, 326, 328, and 330, respectively; and (iii) component 338D of partitioned data word 338 is the sum of components 320A, 320B, 320C, and 320D of partitioned data words 324, 326, 328, and 330, respectively. Accumulator 332 sums partitioned data words 324, 326, 328, and 330 using a partitioned addition operation which is described in greater detail below. As a result, the components of partitioned data words 324, 326, 328, and 330 are summed substantially simultaneously.

Processing transfers from step 216 to step 218 in which packer 336 of image processor 110 scales, clips and packs each of components 334A–D into a respective one of components 338A–D of partitioned pixel word 338. Each of components 338A–D is an eight-bit unsigned integer and represents a pixel in destination buffer 114. Image processor stores partitioned pixel word 338 in destination buffer 114. Thus, image processor 114 maps four subject pixels to graphical object 112 in a single performance of the steps of logic flow diagram 200.

Bilinear Mapping of Multiple-Band Objects

Figure 8:
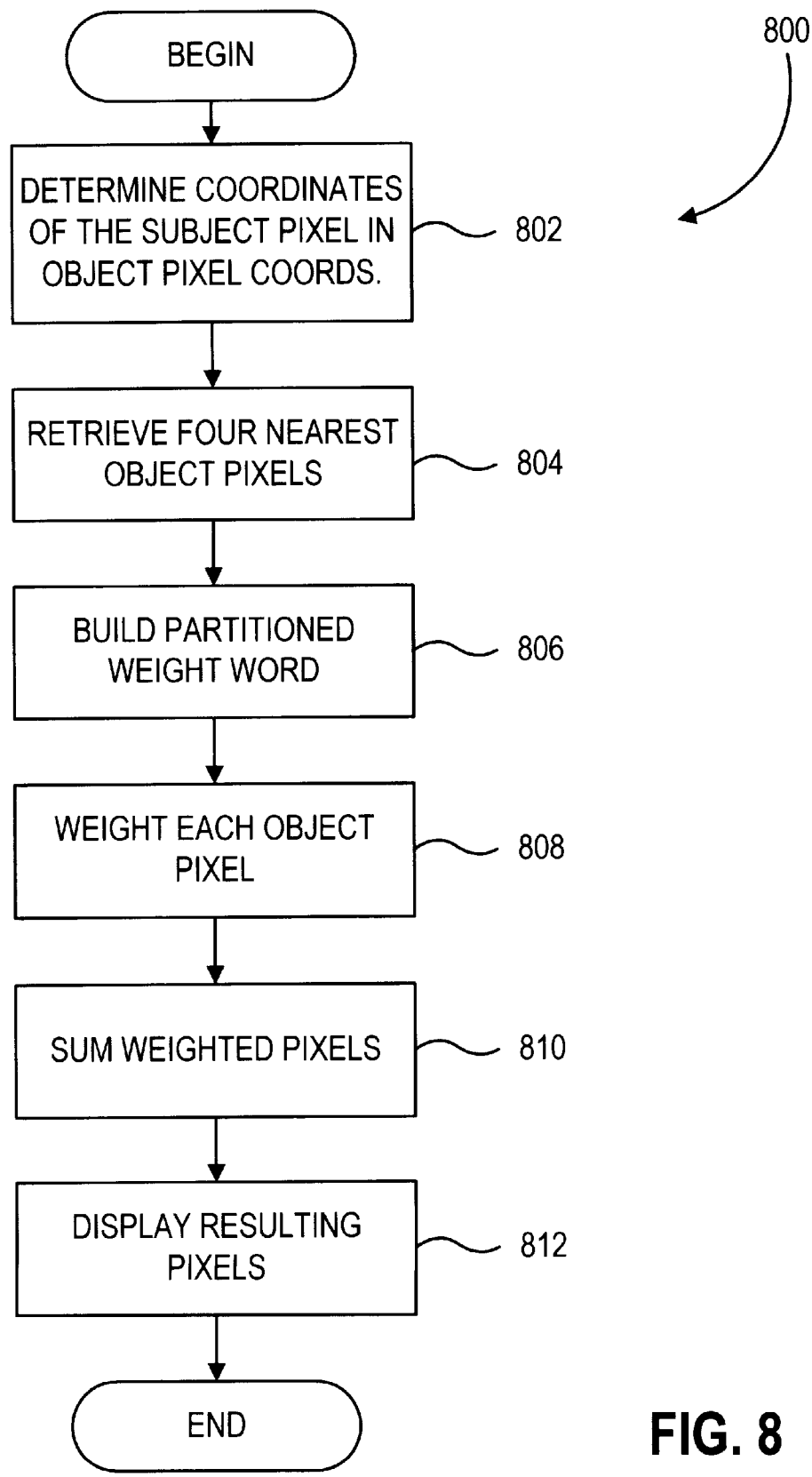
FIG. 8 is a logic flow diagram illustrating bilinear mapping of multiple-band pixels of a graphical object in accordance with the present invention.

Image processor 110 processes graphical objects with multiple bands in different manner than that described above. For example, if graphical image 112 has three or four bands, image processor 110 maps object pixels of graphical object 112 to destination buffer 114 according to logic flow diagram 800 (FIG. 8). Pixels of a graphical image which has four bands have four data components, e.g., red, green, blue, and alpha. Similarly, pixels of a graphical image which has three bands have three data components, e.g., red, green, and blue. Processing according to logic flow diagram 800 begins at step 802.

Figure 9:
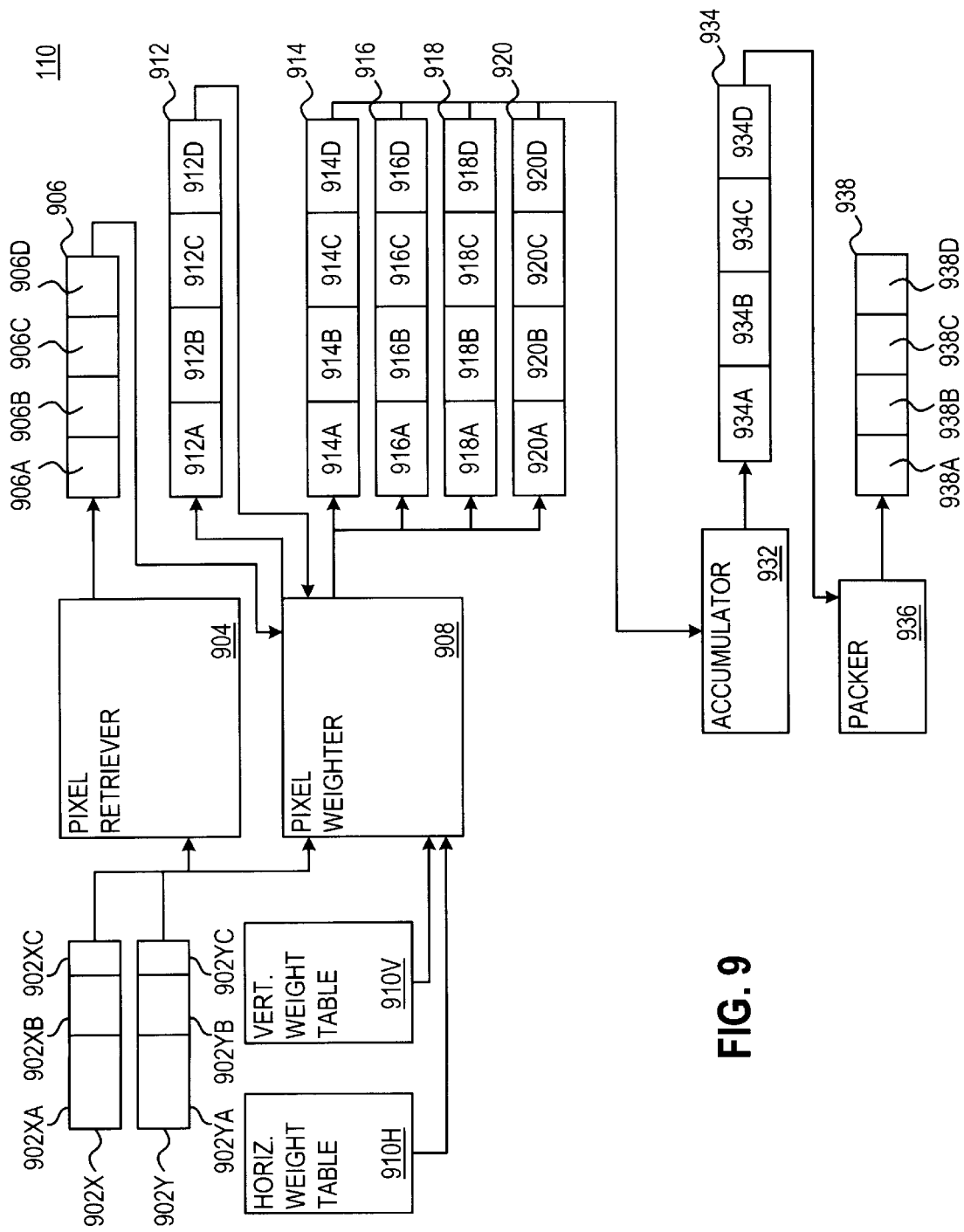
FIG. 9 is a block diagram of a second embodiment of the image processor of FIG. 1.

In step 802, pixel retriever 904 (FIG. 9) of image processor 110 determines the coordinates of a subject pixel of destination buffer 114 in the coordinate space of graphical object 112 and stores data representing the coordinates of the subject pixel in records 902X and 902Y in a manner which is directly analogous to that described above with respect to pixel retriever 304 (FIG. 3) and records 302X and 302Y in step 204 (FIG. 2). Processing transfers from step 802 (FIG. 8) to step 804 in which pixel retriever 904 retrieves from graphical object 112 the four nearest object pixels of graphical object 112 in the manner described above with respect to step 206 (FIG. 2) and FIG. 4. However, in the context of FIGS. 8 and 9, pixel retriever 904 stores multiple data components of a single object pixel in components 906A–D of partitioned pixel word 906. If graphical object 112 (FIG. 1) has fewer than four bands, then excess ones of components 906A–D (FIG. 9) are ignored or a filled with data having a value of zero.

Figure 5:
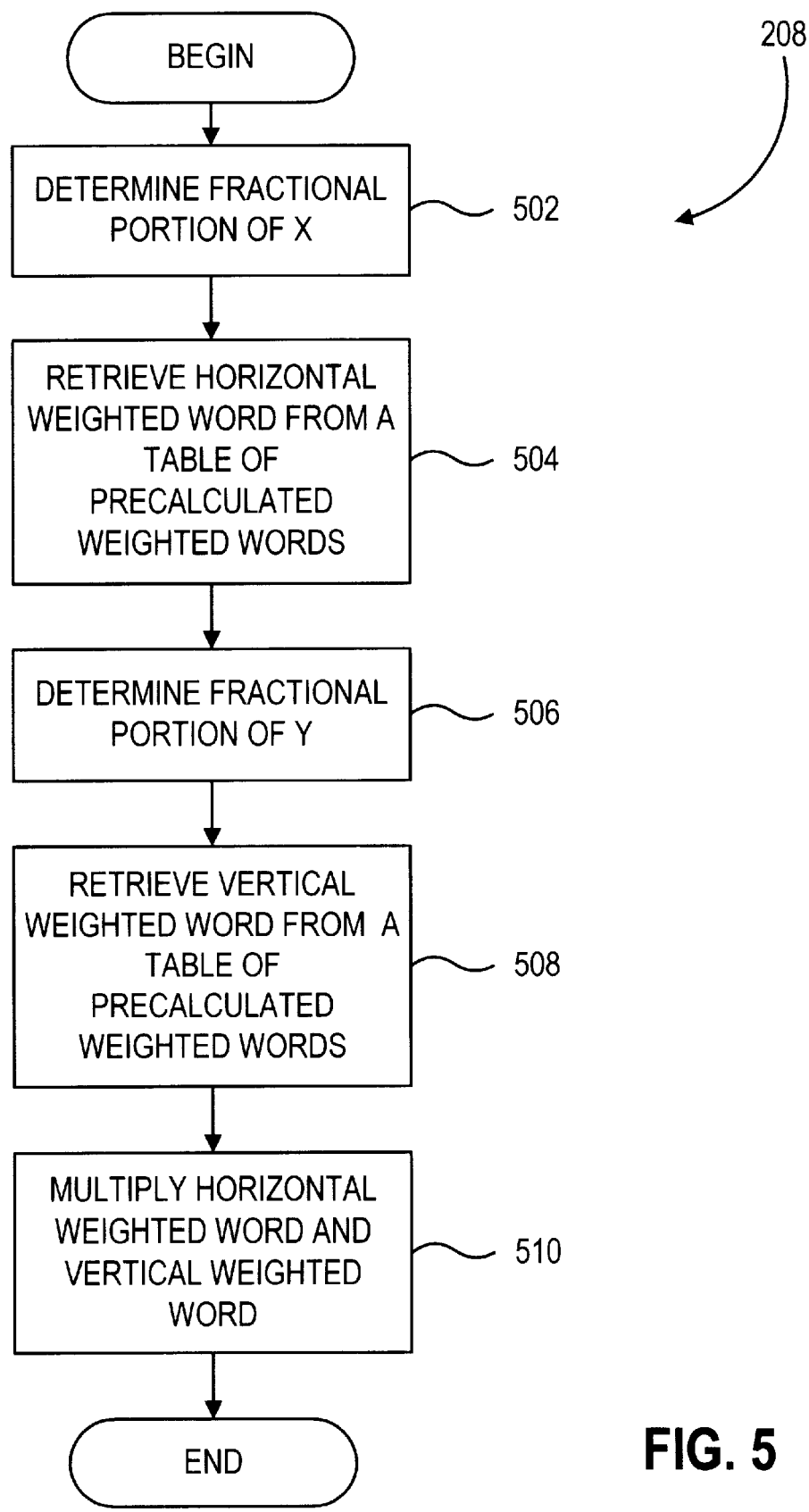
FIG. 5 is a logic flow diagram illustrating in greater detail a step of the logic flow diagram of FIG. 2.

Processing transfers from step 804 (FIG. 8) to step 806 in which pixel weighter 908 (FIG. 9) of image processor 110 builds a partitioned weight word 912 from records 902X and 902Y using horizontal weight table 910H and vertical weight table 910H in a manner which is directly analogous to that described above with respect to pixel weighter 308 (FIG. 3), records 302X and 302Y, horizontal weight table 310H and vertical weight table 310H in step 208 (FIG. 2) and logic flow diagram 208 (FIG. 5). Partitioned weight word 912 (FIG. 9) is directly analogous to partitioned weight word 312 (FIG. 3). Processing transfers from step 806 (FIG. 8) to step 808 in which each of the four nearest object pixels retrieved in step 804 is weighted according to components 912A–D of partitioned weight word 912. Since components 906A–D represent various data components of a single object pixel, each of components 912A–D pertains to all components of a partitioned pixel word such as partitioned pixel word 906. Therefore, when data representing the first of the retrieved object pixels are stored in partitioned pixel word 906, pixel weighter 908 multiplies component 912A of partitioned weight word 912 by each of components 906A–D of partitioned pixel word 906 substantially simultaneously using a partitioned multiplication operation, e.g., either the FMUL8×16AU operation or the FMUL8×16AL operation, which are described more completely below.

The results of such partitioned multiplication are stored in partitioned pixel word 914. In other words, components 914A, 914B, 914C, and 914D are the products of component 912A and components 906A, 906B, 906C, and 906D, respectively. When data representing the second, third, or fourth of the retrieved object pixels are stored in partitioned pixel word 906, pixel weighter 908 multiplies component 912B, 912C, or 912D, respectively, of partitioned weight word 912 by each of components 906A–D of partitioned pixel word 906 in an analogous manner. Pixel weighter 908 (i) stores the product of the second object pixel and component 912B in partitioned pixel word 916, (ii) stores the product of the third object pixel and component 912C in partitioned pixel word 918, and (iii) stores the product of the fourth object pixel and component 912D in partitioned word 920.

Therefore, after step 808, components 914A, 916A, 918A, and 920A contain data which represent weighted first data components of each of the four object pixels. Similarly, (i) components 914B, 916B, 918B, and 920B contain data which represent weighted second data components of each of the four object pixels, (ii) components 914C, 916C, 918C, and 920C contain data which represent weighted third data components of each of the four object pixels, and (iii) components 914D, 916D, 918D, and 920D contain data which represent weighted fourth data components of each of the four object pixels. From step 808 (FIG. 8), processing transfers to step 810 in which accumulator 932 (FIG. 9) of image processor 110 sums the respective components of partitioned pixel words 914, 916, 918, and 920 to form partitioned pixel word 934. The respective components of partitioned pixel words 914–920 are summed substantially simultaneously using a partitioned addition operation which is described more completely below. Components 934A–D of partitioned pixel word 934 contain data representing respective data components of the subject pixel. Partitioned pixel word 934 therefore contains data representing the subject pixel as mapped.

Processing transfers from step 810 (FIG. 8) to step 812 in which packer 936 of image processor 110 scales, clips and packs each of components 934A–D into a respective one of components 938A–D of partitioned pixel word 938. Each of components 938A–D is an eight-bit unsigned integer and represents a pixel in destination buffer 114. Image processor 110 stores partitioned pixel word 938 in destination buffer 114. Thus, image processor 114 maps four subject pixels to graphical object 112 in a single performance of the steps of logic flow diagram 800.

Bicubic Mapping of Single-Band Objects

Figure 10A:
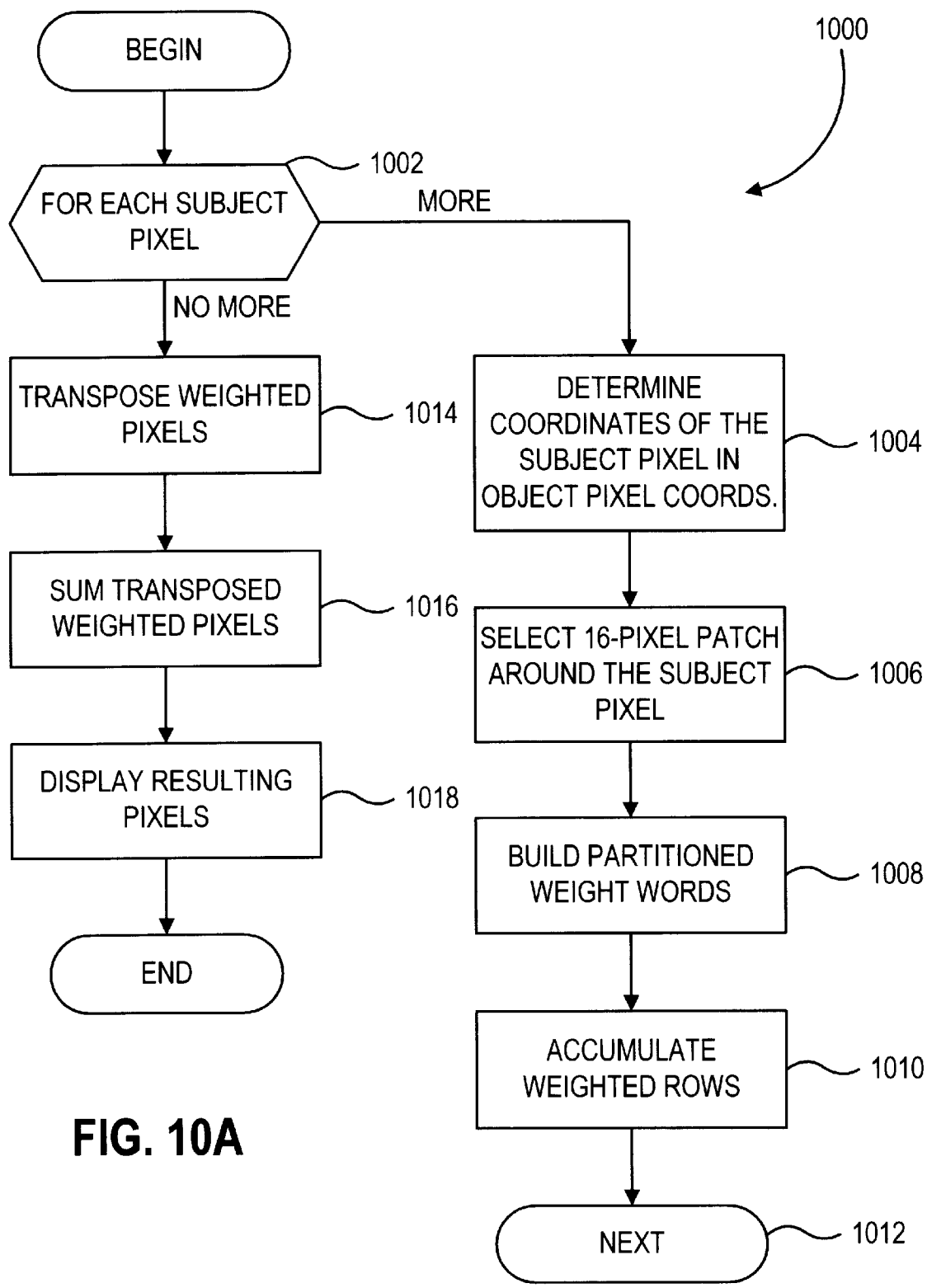
FIGS. 10A and 10B are logic flow diagrams illustrating bicubic mapping of single-band pixels of a graphical object in accordance with the present invention.

In addition to, or as an alternative to, bilinear mapping described above, image processor 110 (FIG. 1) can perform bicubic mapping of object pixels of graphical object 112 to subject pixels of destination buffer 114. Image processor 110 maps single-band object pixels of graphical object 112 to four single-band subject pixels of destination buffer 114 according to logic flow diagram 1000 (FIG. 10A). Processing according to logic flow diagram 1000 begins at loop step 1002.

Loop step 1002 and next step 1012 define a loop in which each of four subject pixels of destination buffer 114 (FIG. 1) are processed by image processor 110. For each of the subject pixels, processing transfers from loop step 1002 (FIG. 10A) to step 1004. In step 1004, pixel retriever 1104 (FIG. 11) of image processor 110 determines the coordinates of the subject pixel in the coordinate space of graphical object 112 (FIG. 1) and stores a horizontal component of the coordinates of the subject pixel in record 1102X (FIG. 11) and stores a vertical component of the coordinates of the subject pixel in record 1102Y. Records 1102X and 1102Y are directly analogous to records 302X (FIG. 3) and 302Y which are described above. Processing transfers from step 1004 (FIG. 10A) to step 1006.

Figure 11:
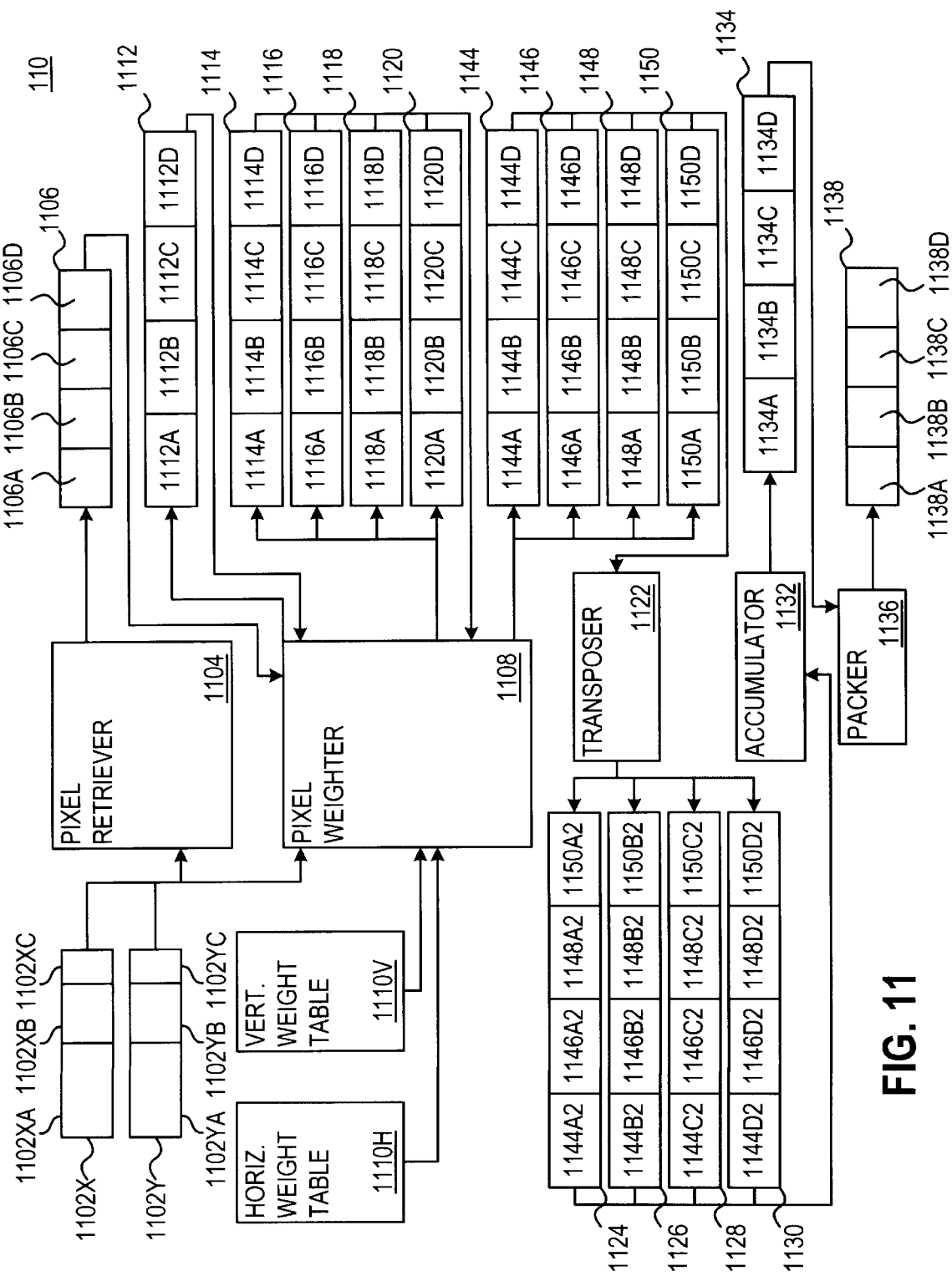
FIG. 11 is a block diagram of a third embodiment of the image processor of FIG. 1.
Figure 12:
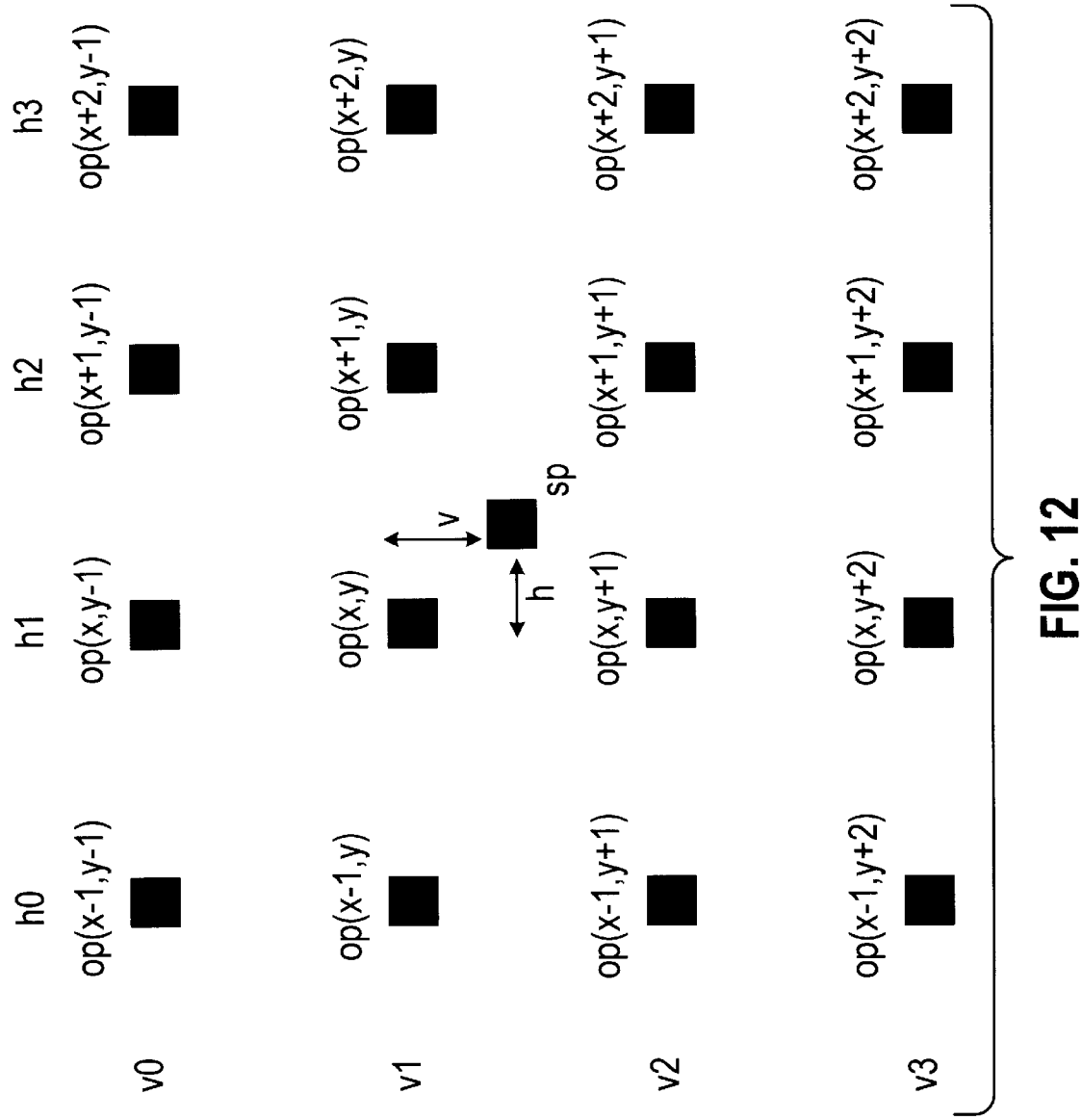
FIG. 12 illustrates a pixel of a graphical object and pixels of a destination graphical image buffer for bicubic mapping of the graphical object pixel.

In step 1006, pixel retriever 1104 (FIG. 11) selects a four-pixel by four-pixel patch of graphical object 112 (FIG. 1) the center of which is near the subject pixel. The sixteen-pixel patch is shown in FIG. 12. The coordinates of object pixel op(x,y) are specified by integer portions 1102XA and 1102YA of records 1102X and 1102Y. In other words, the coordinates of object pixel op(x,y) result when the coordinates of subject pixel sp in the coordinate space of graphical object 112 (FIG. 1) are truncated to integer values. The value assigned to subject pixel sp is defined by the following equation.

$$sp = op(x-1,y-1) \cdot h0 \cdot v0 + op(x,y-1) \cdot h1 \cdot v0 + op(x+1,y-1) \cdot h2 \cdot v0 + op(x+2,y-1) \cdot h3 \cdot v0 + op(x-1,y) \cdot h0 \cdot v1 + op(x,y) \cdot h1 \cdot v1 + op(x+1,y) \cdot h2 \cdot v1 + op(x+2,y) \cdot$$

$$h3 \cdot + op(x-1,y+1) \cdot h0 \cdot v2 + op(x,y+1) \cdot h1 \cdot v2 + op(x+1,y+1) \cdot h2 \cdot v2 + op(x+2,y+1) \cdot h3 \cdot v2 + op(x-1,y+2) \cdot h0 \cdot v3 + op(x,y+2) \cdot h1 \cdot v3 + op(x+1,y+2) \cdot h2 \cdot v3 + op(x+2,y+2) \cdot h3 \cdot v3 \qquad (2)$$

In equation (2), horizontal coefficients h0, h1, h2, and h3 are based on horizontal distance h (FIG. 12) between subject pixel sp and object pixel op(x,y), and vertical coefficients v0, v1, v2, and v3 are based on vertical distance v between subject pixel sp and object pixel op(x,y). In one embodiment, horizontal coefficients h0–3 and vertical coefficients v0–3 are defined by the following equations.

$$h0 = -0.5h^3 + h^2 - 0.5h \qquad (3)$$

$$h1 = 1.5h^3 - 2.5h^2 + 1$$

$$h2 = -1.5h^3 + 2h^2 + 0.5h$$

$$h3=0.5h^3-0.5h^2$$

$$v0=-0.5v^3+v^2-0.5v$$

$$v1=1.5v^3-2.5v^2+1$$

$$v2=-1.5v^3+2v^2+0.5v$$

$$v3=0.5v^3-0.5v^2$$

Once pixel retriever 1104 (FIG. 11) selects the sixteen-pixel patch in step 1006 (FIG. 10A), processing transfers to step 1008 in which pixel weighter 1108 (FIG. 11) of image processor 110 builds partitioned weight words 1112, 1114, 1116, 1118, and 1120.

Figure 13:
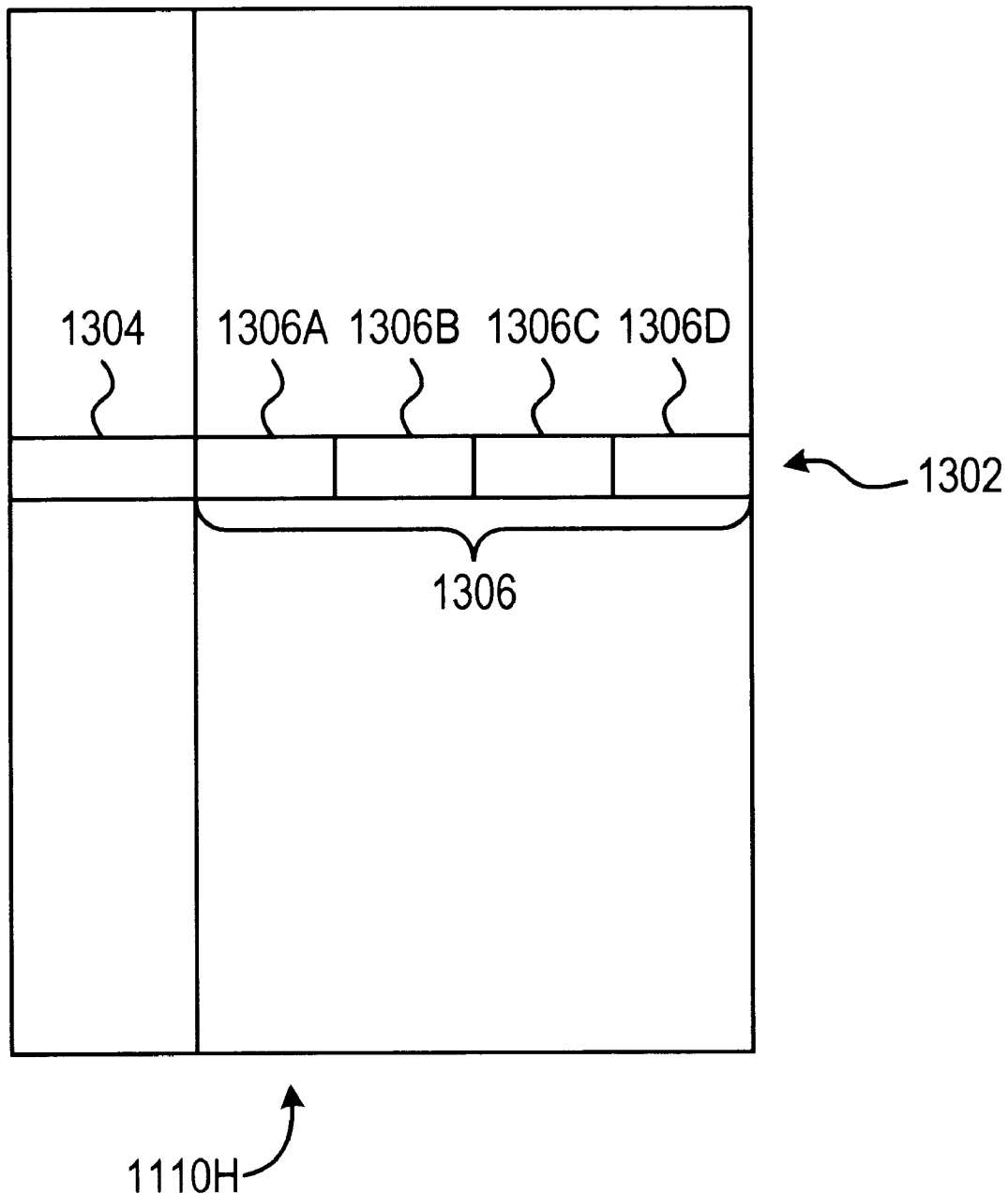
FIG. 13 is a block diagram of a horizontal weight table in accordance with the present invention.

Pixel weighter 1108 (i) retrieves fractional portion 1102XB and fractional portion 1102YB, (ii) uses fractional portion 1102XB to retrieve from horizontal weight table 1110H partitioned weight word 1112, and (iii) uses fractional portion 1102YB to retrieve from vertical weight table 1110V partitioned weight words 1114–1120. Partitioned weight word 1112 includes components 1112A, 1112B, 1112C, and 1112D which include data representing coefficients h0, h1, h2, and h3, respectively. Horizontal weight table 1110H is shown in greater detail in FIG. 13. For each possible value stored in fractional portion 1102XB (FIG. 11), horizontal weight table 1110H (FIG. 13) includes a record in which a value of fractional portion 1102XB is associated with a partitioned weight word. For example, record 1302 of horizontal weight table 1110H associates value 1304, which represents a possible value of fractional portion 1102XB, with partitioned weight word 1306. Components 1306A, 1306B, 1306C, and 1306D of partitioned weight word 1306 include data whose values represent coefficients h0, h1, h2, and h3, respectively. The data stored in components 1306A, 1306B, 1306C, and 1306D are precalculated according to equations (3) above in which h corresponds to value 1304, which in turn corresponds to a particular value of fractional portion 1102XB (FIG. 11). Therefore, arithmetic operations which would otherwise be required to calculate coefficients h0, h1, h2, and h3 according to equations (3) above are obviated.

Partitioned weight word 1114 includes components 1114A–D, each of which includes data whose value corresponds to coefficient v0 of equation (2) above, which corresponds to a row of object pixels of the sixteen-pixel patch as described above. Similarly, partitioned weight words 1116, 1118, and 1120 includes components 1116A–D, 1118A–D, and 1120A–D, respectively. Each of components 1116A–D includes data whose value corresponds to coefficient h1. Each of components 1118A–D includes data whose value corresponds to coefficient h2. Each of components 1120A–D includes data whose value corresponds to coefficient h3.

Figure 14:
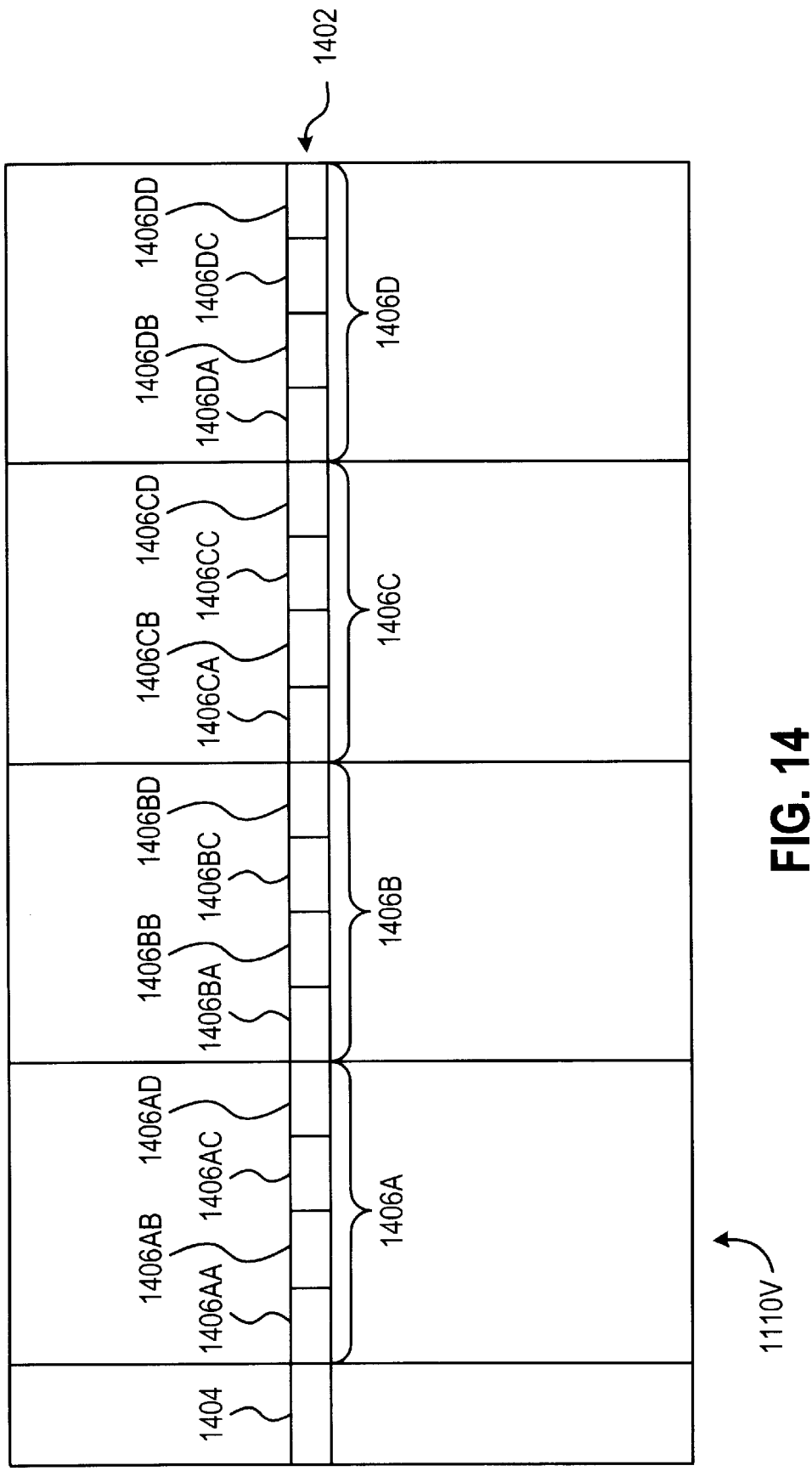
FIG. 14 is a block diagram of a vertical weight table in accordance with the present invention.

Vertical weight table 1110V is shown in greater detail in FIG. 14. For each possible value stored in fractional portion 1102YB (FIG. 11), vertical weight table 1110V (FIG. 13) includes a record in which a value of fractional portion 1102YB is associated with four partitioned weight words. For example, record 1402 of vertical weight table 1110V associates value 1404, which represents a possible value of fractional portion 1102YB, with partitioned weight words 1406A–D. Each of components 1406AA, 1406AB, 1406AC, and 1406AD of partitioned weight word 1406A include data whose values represent coefficient h0. Similarly, each of the components of partitioned weight words 1406B, 1406C, and 1406D include data whose values represent coefficients h1, h2, and h3, respectively. The data stored in components of partitioned weight words 1406A, 1406B, 1406C, and 1406D are precalculated according to equations (3) above in which v corresponds to value 1404, which in turn corresponds to a particular value of fractional portion 1102YB (FIG. 11). Therefore, arithmetic operations which would otherwise be required to calculate coefficients v0, v1, v2, and v3 according to equations (3) above are obviated.

Figure 10B:
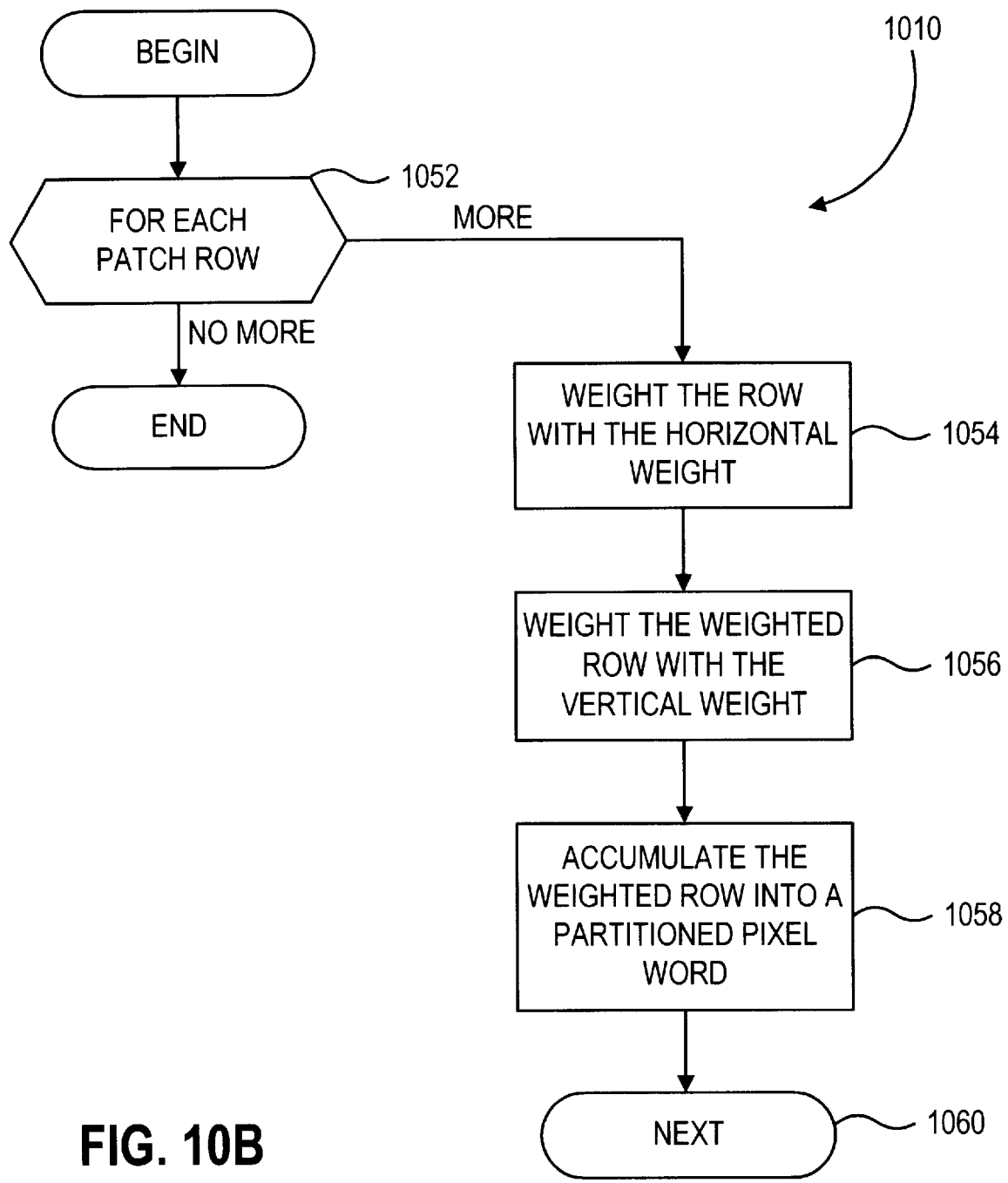

From step 1008 (FIG. 10A), processing transfers to step 1010 in which pixel weighter 1108 (FIG. 11) weights and accumulates object pixels of the sixteen-pixel patch. Step 1010 is shown in greater detail as logic flow diagram 1010 (FIG. 10B) in which processing begins in loop step 1052. Loop step 1052 and next step 1060 define a loop in which each row of object pixels of the sixteen-pixel patch is processed according to steps 1054–1058. During each iteration of the loop defined by loop step 1052 and next step 1060, the row of object pixels is referred to as the subject row. For each row of object pixels, processing transfers from loop step 1052 to step 1054.

In step 1054, pixel weighter 1108 (FIG. 11) weights the subject row of object pixels using partitioned weight word 1112. Pixel weighter 1108 weights the subject row by multiplying the components of partitioned pixel word 1106 by respective components of partitioned weight word 1112 substantially simultaneously in a partitioned multiplication operation which is described in greater detail below. In one embodiment, each of components 1106A–D of partitioned pixel word 1106 is a single byte and is multiplied by a respective one of components 1112A–D of partitioned weight word 1112, which are each a sixteen-bit fixed point number, substantially simultaneously using the FMUL8×16 operation described below. During each iteration of the loop defined by loop step 1052 (FIG. 10B) and next step 1060, components 1106A–D (FIG. 11) of partitioned pixel word 1106 each contain data representing a respective pixel of the subject row. The result of the multiplication of step 1054 (FIG. 10B) is a partitioned data word which includes four partitioned components which in turn include data representing the product of a respective one of the four pixels of the subject row and a respective one of coefficients h0, h1, h2, and h3. For example, if the subject row is the first row, the components of the resulting partitioned data word include data whose values are (i) op(x−1,y−1)·h0, (ii) op(x, y−1)·h1, (iii) op(x+1,y−1)·h2, and (iv) op(x+2,y−1)·h3.

Processing transfers from step 1054 (FIG. 10B) to step 1056 in which the resulting partitioned data word from step 1054 is weighted according to the one of partitioned weight words 1114–1120 (FIG. 11) which corresponds to the subject row. For example, if the first row is the subject row, the resulting data word from step 1054 (FIG. 10B) is weighted according to partitioned weight word 1114 (FIG. 11) to produce as values of respective components of the resulting partitioned data word (i) op(x−1,y−1)·h0·v0, (ii) op(x,y−1)·h1·v0, (iii) op(x+1,y−1)·h2·v0, and (iv) op(x+2,y−1)·h3·v0.

Processing transfers from step 1056 (FIG. 10B) to step 1058 in which pixel weighter 1108 (FIG. 11) accumulates the resulting partitioned data word into one of partitioned data words 1144, 1146, 1148, and 1150. Each of partitioned data words 1144, 1146, 1148, and 1150 corresponds to a respective one of the subject pixels processed according to the loop defined by loop step 1002 (FIG. 10A) and next step 1012. For example, the first subject pixel processed according to the loop defined by loop step 1002 and next step 1012 corresponds to partitioned data word 1144 (FIG. 11). If, for example, the subject pixel corresponds to partitioned data word 1144, pixel weighter 1108 accumulates the resulting partitioned data of step 1058 (FIG. 10B) into partitioned data word 1144 (FIG. 11).

After the first iteration of the loop defined by loop step 1052 (FIG. 10B) and next step 1060, components 1144A–D (FIG. 11) of partitioned data word 1144 include data whose values are (i) op(x−1,y−1)·h0·v0, (ii) op(x,y−1)·h1·v0, (iii) op(x+1,y−1)·h2·v0, and (iv) op(x+2,y−1)·h3·v0. During the second iteration of the loop defined by loop step 1052 (FIG. 10B) and next step 1060, the pixels of the second row of the sixteen-pixel patch selected in step 1006 (FIG. 10A) and shown in FIG. 12 are multiplied by respective components of partitioned weight word 1112 (FIG. 11), whose values are h0, h1, h2, and h3, respectively, and partitioned weight word 1116, whose values are v1, v1, v1, and v1, respectively. Thus, after the second iteration of the loop defined by loop step 1052 (FIG. 10B) and next step 1060, components 1144A–D (FIG. 11) of partitioned data word 1144 include data whose values are (i) op(x−1,y−1)·h0·v0+op(x−1,y)·h0·v1, (ii) op(x,y−1)·h1·v0+op(x,y)·h1·v1, (iii) op(x+1,y−1)·h2·v0+op(x+1,y)·h2·v1, and (iv) op(x+2,y−1)·h3·v0+op(x+2,y)·h3·v1.

Similarly, after the third iteration of the loop defined by loop step 1052 (FIG. 10B) and next step 1060, components 1144A–D (FIG. 11) of partitioned data word 1144 include data whose values are (i) op(x−1,y−1)·h0·v0+op(x−1,y)·h0·v1+op(x−1,y+1)·h0·v2, (ii) op(x,y−1)·h1·v0+op(x,y)·h1·v1+op(x,y+1)·h1·v2, (iii) op(x+1,y−1)·h2·v0+op(x+1,y)·h2·v1+op(x+1,y+1)·h2·v2, and (iv) op(x+2,y−1)·h3·v0+op(x+2,y)·h3·v1+op(x+2,y+1)·h3·v2. After the fourth iteration of the loop defined by loop step 1052 (FIG. 10B) and next step 1060, components 1144A–D (FIG. 11) of partitioned data word 1144 include data whose values are (i) op(x−1,y−1)·h0·v0+op(x−1,y)·h0·v1+op(x−1,y+1)·h0·v2+op(x−1, y+2)·h0·v3, (ii) op(x,y−1)·h1·v0+op(x,y)·h1·v1+op(x,y+1)·h1·v2+op(x,y+2)·h1·v3, (iii) op(x+1,y−1)·h2·v0+op(x+1,y)·h2·v1+op(x+1,y+1)·h2·v2+op(x+1,y+2)·h2·v3, and (iv) op(x+2,y−1)·h3·v0+op(x+2,y)·h3·v1+op(x+2,y+1)·h3·v2+op(x+2,y+2)·h3·v3. After the fourth iteration of the loop defined by loop step 1052 (FIG. 10B) and next step 1060, processing according to logic flow diagram 1010, and therefore step 1010 (FIG. 10A), terminates. The sum of components 1144A–D (FIG. 11) of partitioned data word 1144 after step 1010 (FIG. 10A) as described above is the value of the subject pixel as defined by equation (2) above. Rather than immediately calculating the sum of components 1144A–D (FIG. 11), three similar partitioned data words 1146, 1148, and 1150 are formed by subsequent iterations of the loop defined by loop step 1002 (FIG. 10A) and next step 1012 for three more respective subject pixels of destination buffer 114 (FIG. 1) to take advantage of the particular capabilities of processor 102, i.e., the FPADD16 operation which is a partitioned addition operation as described more completely below.

After each of the four subject pixels have been processed according to the loop defined by loop step 1002 (FIG. 10A) and next step 1012, processing transfers from loop step 1002 to step 1014. In step 1014, transposer 1122 (FIG. 11) of image processor 110 transposes partitioned data words 1144–1150 to form partitioned data words 1124–1130. In particular, transposer 1122 forms partitioned data words 1124–1130 such that (i) the first component of each of partitioned data words 1124–1130 is equal to a respective component of partitioned data word 1144, (ii) the second component of each of partitioned data words 1124–1130 is equal to a respective component of partitioned data word 1146, (iii) the third component of each of partitioned data words 1124–1130 is equal to a respective component of partitioned data word 1148, and (iv) the fourth component of each of partitioned data words 1124–1130 is equal to a respective component of partitioned data word 1150. Thus, the sum of the first, second, third, and fourth components of partitioned data words 1124–1130 are the sums of the components of partitioned data words 1144–1150, respectively, and are therefore the resulting values for the four respective subject pixels according to equation (2) above. Processing transfers from step 1014 (FIG. 10A) to step 1016.

In step 1016, accumulator 1132 (FIG. 11) sums partitioned data words 1124–1130 and stores the resulting sum in partitioned data word 1134. In other words, components 1134A–D of partitioned data word 1134 include data whose values are, respectively, (i) the sum of components 1124A, 1126A, 1128A, and 1130A, (ii) the sum of components 1124B, 1126B, 1128B, and 1130B, (iii) the sum of components 1124C, 1126C, 1128C, and 1130C, and (iv) the sum of components 1124D, 1126D, 1128D, and 1130D. Therefore, each component of partitioned data word 1134 represents a subject pixel of destination buffer 114 (FIG. 1) as mapped from graphical object 112 by image processor 110. Accumulator 1132 sums the components of partitioned data words 1124–1130 substantially simultaneously by performance of a partitioned addition operation which is described in greater detail below. From step 1016 (FIG. 10A), processing transfers to step 1018.

In step 1018, packer 1136 (FIG. 11) of image processor 110 scales, clips and packs each of components 1134A–D into a respective one of components 1138A–D of partitioned pixel word 1138. Each of components 1138A–D is an unsigned bytes and represents a pixel in destination buffer 114. Image processor stores partitioned pixel word 1138 in destination buffer 114. Thus, image processor 110 maps four subject pixels to graphical object 112 in a single performance of the steps of logic flow diagram 1000.

Bicubic Mapping of Multiple-Band Objects

Figure 15:
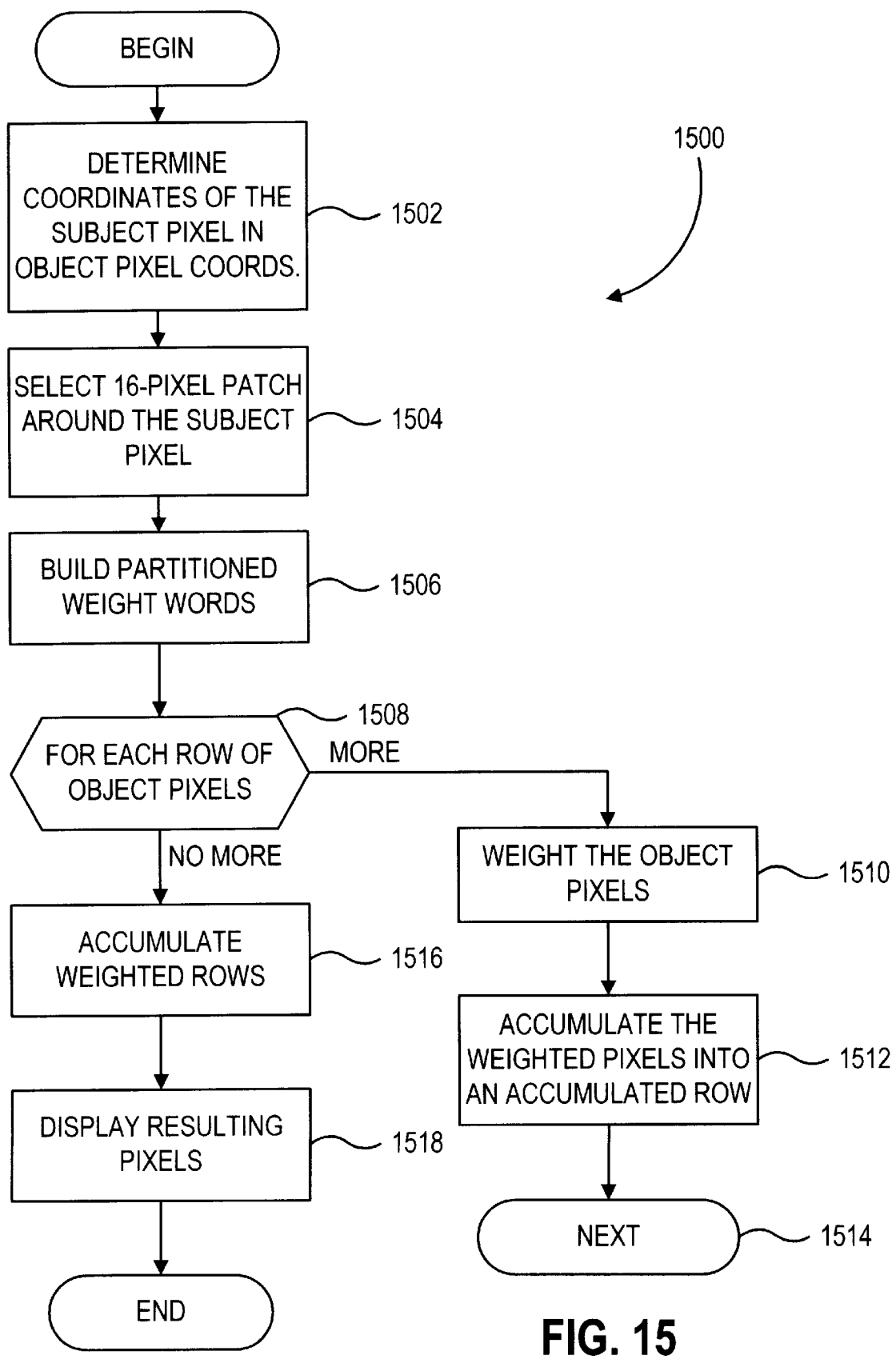
FIG. 15 is a logic flow diagram illustrating bicubic mapping of multiple-band pixels of a graphical object in accordance with the present invention.
Figure 16A:
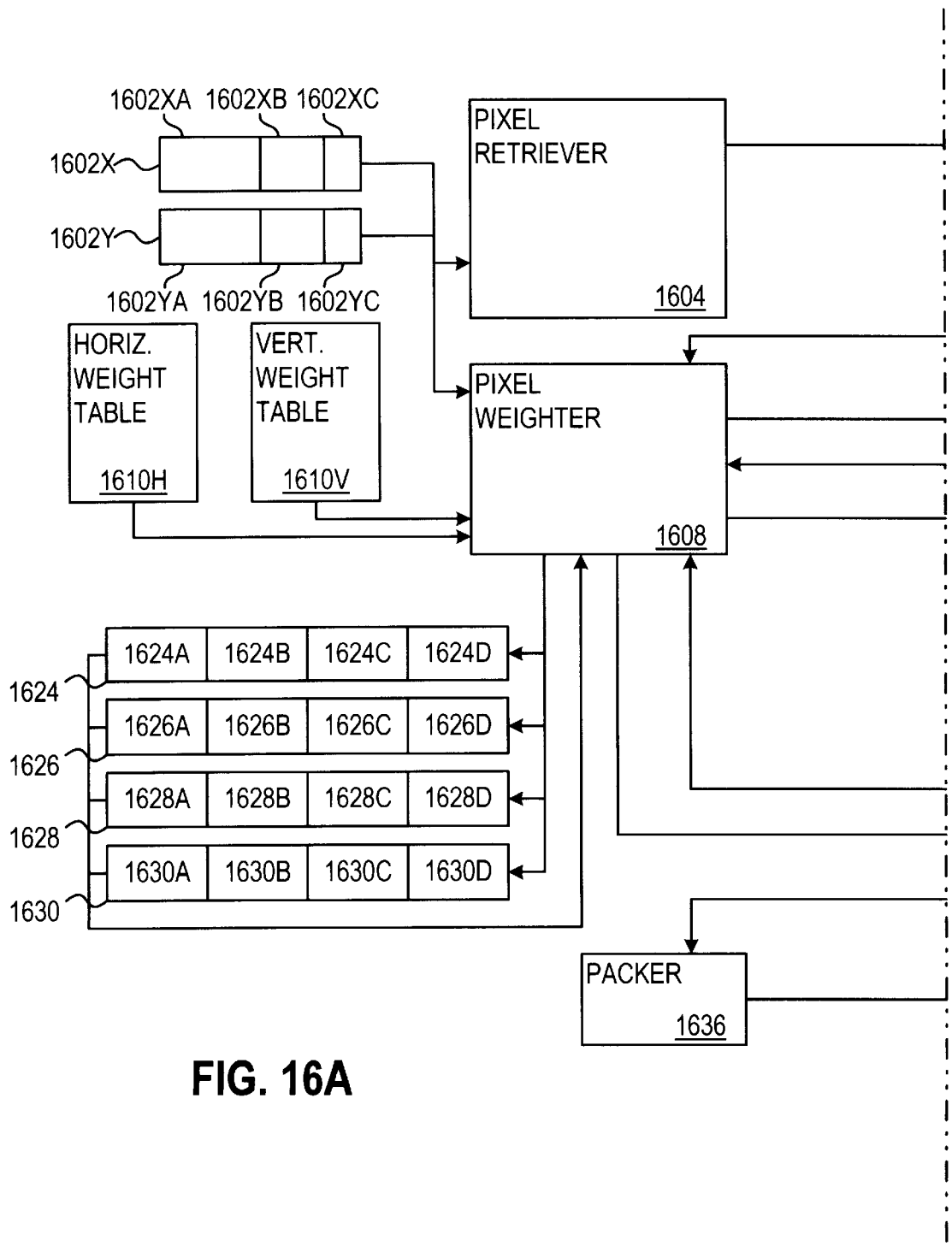
FIG. 16 is a block diagram of a fourth embodiment of the image processor of FIG. 1.

Image processor 110 (FIG. 1) maps object pixels of graphical object 112 which have multiple bands to a subject pixel of destination buffer 114 using bicubic interpolation according to logic flow diagram 1500 (FIG. 15). The components of image processor 110 which carry out the steps of logic flow diagram 1500 are shown in FIG. 16. Processing according to logic flow diagram 1500 (FIG. 15) begins in step 1502.

In step 1502, pixel retriever 1604 (FIG. 16) of image processor 110 determines the coordinates of a subject pixel of destination buffer 114 (FIG. 1) in the coordinate space of graphical object 112 and stores the coordinates in records 1602X (FIG. 16) and 1602Y, which are directly analogous to records 1102X (FIG. 11) and 1102Y described above. Processing transfers from step 1502 (FIG. 15) to step 1504 in which pixel retriever 1604 (FIG. 16) selects a sixteen-pixel patch of graphical object 112 (FIG. 1) whose center is near the subject pixel. Step 1504 (FIG. 15) is directly analogous to step 1006 (FIG. 10A) described above. Processing transfers from step 1504 (FIG. 15) to step 1506 in which pixel retriever 1604 (FIG. 16) builds partitioned weight words 1612, 1614, 1616, 1618, and 1620 in a manner which is directly analogous to the building of partitioned weight words 1112 (FIG. 11), 1114, 1116, 1118, and 1120, respectively, as described above with respect to step 1008 (FIG. 10A). Briefly, partitioned weight word 1612 is retrieved from horizontal weight table 1610H according to fractional portion 1602XB of record 1602X. Partitioned weight word 1612 includes components 1612A–D which includes data having the respective values h0, h1, h2, and h3. Partitioned weight words 1614, 1616, 1618, and 1620 are retrieved from vertical weight table 1610V according to fractional portion 1602YB of record 1602Y. Partitioned weight words 1614, 1616, 1618, and 1620 each has four components. Components 1614A–D of partitioned weight word 1614 each includes data whose value is v0; components 1616A–D of partitioned weight word 1616 each includes data whose value is v1; components 1618A–D of partitioned weight word 1618 each includes data whose value is v2; and components 1620A–D of partitioned weight word 1620 each includes data whose value is v3.

Processing transfers from step 1506 (FIG. 15) to loop step 1508. Loop step 1508 and next step 1514 define a loop in which each row of object pixels of the selected sixteen-pixel patch is processed according to steps 1510 and 1512. During each iteration of the loop defined by loop step 1508 and next step 1514, the row processed is called the subject row. For each row of object pixels of the selected sixteen-pixel patch, processing transfers from loop step 1508 to step 1510.

In step 1510, pixel retriever 1604 (FIG. 16) retrieves each object pixel of the subject row and stores each object pixel in a respective one of partitioned pixel words 1646, 1656, 1666, and 1676, which are directly analogous to one another. The following description of partitioned pixel word 1646 is also applicable to partitioned pixel words 1656, 1666, and 1676. Partitioned pixel word 1646 includes components 1646A–D which are each an unsigned byte in one embodiment and which contain data which in turn represent a component of an object pixel. For example, components 1646A–D can store data representing alpha, blue, green, and red components, respectively, of an object pixel. If an object pixel has fewer than four components, e.g., has only red, green, and blue component, excess components of partitioned pixel word 1646 are ignored and can be initialized to zero. Further in step 1510 (FIG. 15), pixel weighter 1608 (FIG. 16) of image processor 110 multiplies each component each of partitioned pixel words 1646, 1656, 1666, and 1676 by a respective weight stored in a respective component of partitioned weight word 1612. In step 1512 (FIG. 15), pixel weighter 1608 (FIG. 16) accumulates the weighted object pixels into one of partitioned data words 1624, 1626, 1628, and 1630, each of which corresponds to a particular row of object pixels processed according to the loop defined by loop step 1508 (FIG. 15) and next step 1514. For example, during processing of the first row of object pixels, the weighted object pixels are accumulated into partitioned data word 1624 (FIG. 16). Then following example is illustrative.

When processing the first row of object pixels, i.e., object pixels op(x−1,y−1), op(x,y−1), op(x+1,y−1), and op(x+2,y−1) (FIG. 12), pixel retriever 1604 stores object pixels op(x−1,y−1), op(x,y−1), op(x+1,y−1), and op(x+2,y−1) in partitioned pixel words 1646, 1656, 1666, and 1676, respectively. Pixel weighter 1608 multiplies each component of partitioned pixel word 1646 by component 1612A of partitioned weight word 1612 substantially simultaneously using a partitioned multiplication operation, e.g., the FMUL8×16AU operation or the FMUL8×16AL operation, each of which is described in greater detail below. As described above, component 1612A includes data whose value is h0. Pixel weighter 1608 stores the resulting partitioned product in partitioned data word 1624. Therefore, partitioned data word 1624 contains data representing the value op(x−1,y−1)·h0, and one or more of components 1624A–D includes data representing a respective data component of object pixel op(x−1,y−1) multiplied by a coefficient whose value is h0.

Pixel weighter 1608 multiplies each component of partitioned pixel work 1656 by component 1612B of partitioned weight word 1612 substantially simultaneously in an analogous manner to that described above. As described above, component 1612B includes data whose value is h1. Pixel weighter 1608 adds the resulting partitioned product to partitioned data word 1624, summing the respective components substantially simultaneously using a partitioned addition operation, e.g., the FPADD16 operation, which is described more completely below. Therefore, partitioned data word 1624 contains data representing the value op(x−1,y−1)·h0+op(x,y−1)·h1. Pixel weighter 1608 similarly weights partitioned pixel words 1666 and 1676 using components 1612C and 1612D, respectively, and accumulates the resulting partitioned products into partitioned data word 1624, which then includes data representing the value op(x−1,y−1)·h0+op(x,y−1)·h1+op(x+1,y−1)·h2+op(x+2,y−1)·h3. As a result of subsequent performances of steps 1510 (FIG. 15) and 1512 according to loop step 1508 and next step 1514, partitioned data words 1626 (FIG. 16), 1628, and 1630 include data representing the respective values (i) op(x−1,y)·h0+op(x,y−1)·h1+op(x+1,y)·h2+op(x+2,y)·h3, (ii) op(x−1,y+1)·h0+op(x,y+1)·h1+op(x+1,y+1)·h2+op(x−2,y+1)·h3, and (iii) op(x−1,y+2)·h0+op(x,y+2)·h1+op(x+1,y+2)·h2+op(x+2,y+2)·h3.

Once each row of object pixels has been processed according to the loop defined by loop step 1508 (FIG. 15) and next step 1514, processing transfers from loop step 1508 to step 1516. In step 1516, pixel weighter 1608 (FIG. 16) weights each row as accumulated in partitioned data words 1624–1630 according to a respective one of partitioned weight words 1614–1620 and accumulates the weighted rows into partitioned data word 1634. First, pixel weighter 1608 multiplies respective components of partitioned data word 1624 by respective components of partitioned weight word 1614, each of which includes data representing the value v0, substantially simultaneously using a partitioned multiplication operation, e.g., the FMUL16×16 operation, described below and stores the resulting partitioned product in partitioned data word 1634. Second, pixel weighter 1608 multiplies respective components of partitioned data word 1626 by respective components of partitioned weight word 1616, each of which includes data representing the value v1, substantially simultaneously using the partitioned multiplication operation described below and adds the resulting partitioned product to partitioned data word 1634 using a partitioned addition operation described below storing the resulting partitioned sum in partitioned data word 1634. Third, pixel weighter 1608 multiplies respective components of partitioned data word 1628 by respective components of partitioned weight word 1618, each of which includes data representing the value v2, substantially simultaneously using the partitioned multiplication operation and adds the resulting partitioned product to partitioned data word 1634 using the partitioned addition operation storing the resulting partitioned sum in partitioned data word 1634. Fourth, pixel weighter 1608 multiplies respective components of partitioned data word 1630 by respective components of partitioned weight word 1620, each of which includes data representing the value v3, substantially simultaneously using the partitioned multiplication operation and adds the resulting partitioned product to partitioned data word 1634 using the partitioned addition operation storing the resulting partitioned sum in partitioned data word 1634. Thus, after performance of step 1516 (FIG. 15), partitioned data word 1634 (FIG. 16) includes data which specifies the subject pixel according to equation (2) above. From step 1516 (FIG. 15), processing transfers to step 1518.

In step 1518, packer 1636 (FIG. 16) of image processor 110 scales, clips and packs each of components 1634A–D into a respective one of components 1638A–D of partitioned pixel word 1638. Each of components 1638A–D is an eight-bit unsigned integer and represents a respective data component of the subject pixel in destination buffer 114 (FIG. 1). Image processor 110 stores partitioned pixel word 1638 (FIG. 16) in destination buffer 114 (FIG. 1). Thus, image processor 110 maps object pixels of graphical object 112 to a subject pixel having multiple bands according to logic flow diagram 1500 (FIG. 15).

Processor 102

Figure 17:
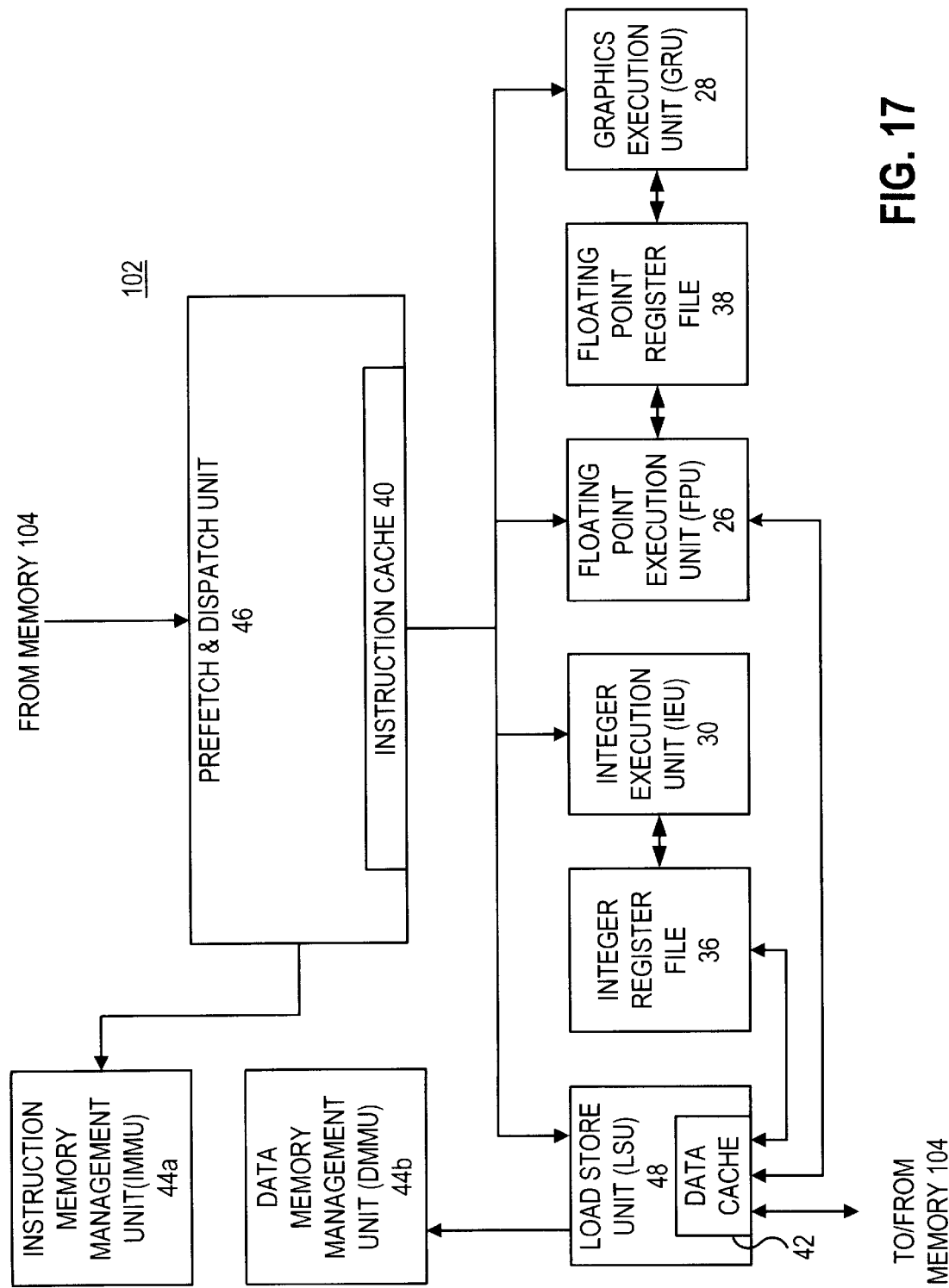
FIG. 17 is a block diagram in greater detail of the processor of FIG. 1.

Processor 102 is shown in greater detail in FIG. 17 and is described briefly herein and more completely in U.S. patent application Ser. No. 08/236,572 by Timothy J. Van Hook, Leslie Dean Kohn, and Robert Yung, filed Apr. 29, 1994 and entitled "A Central Processing Unit with Integrated Graphics Functions" (the '572 application) which is incorporated in its entirety herein by reference. Processor 102 includes a prefetch and dispatch unit (PDU) 46, an instruction cache 40, an integer execution unit (IEU) 30, an integer register file 36, a floating point unit (FPU) 26, a floating point register file 38, and a graphics execution unit (GRU) 28, coupled to each other as shown. Additionally, processor 102 includes two memory management units (IMMU & DMMU) 44a–44b, and a load and store unit (LSU) 48, which in turn includes data cache 120, coupled to each other and the previously described elements as shown. Together, the components of processor 102 fetch, dispatch, execute, and save execution results of computer instructions, e.g., computer instructions of image processor 110 (FIG. 1), in a pipelined manner.

PDU 46 (FIG. 17) fetches instructions from memory 104 (FIG. 1) and dispatches the instructions to IEU 30 (FIG. 17), FPU 26, GRU 28, and LSU 48 accordingly. Prefetched instructions are stored in instruction cache 40. IEU 30, FPU 26, and GRU 28 perform integer, floating point, and graphics operations, respectively. In general, the integer operands and results are stored in integer register file 36, whereas the floating point and graphics operands and results are stored in floating point register file 38. Additionally, IEU 30 also performs a number of graphics operations, and appends address space identifiers (ASI) to addresses of load/store instructions for LSU 48, identifying the address spaces being accessed. LSU 48 generates addresses for all load and store operations. The LSU 48 also supports a number of load and store operations, specifically designed for graphics data. Memory references are made in virtual addresses. MMUs 44a–44b map virtual addresses to physical addresses.

PDU 46, IEU 30, FPU 26, integer and floating point register files 36 and 38, MMUs 44a–44b, and LSU 48 can be coupled to one another in any of a number of configurations as described more completely in the '572 application. As described more completely in the '572 application with respect to FIGS. 8a–8d thereof, GRU 28 performs a number of distinct partitioned multiplication operations and partitioned addition operations. Various partitioned operations used by texture mapper 110 (FIG. 1) are described more completely below.

As described above, processor 102 includes four (4) separate processing units, i.e., LSU 48, IEU 30, FPU 26, and GRU 28. Each of these processing units is described more completely in the '572 application. These processing units operate in parallel and can each execute a respective computer instruction while others of the processing units executes a different computer instruction. GRU 28 executes the partitioned multiplication and partitioned addition operations described below. As described in the '572 application, GRU 28 has two separate execution paths and can execute two instructions simultaneously. GRU 28 can execute a partitioned addition operation while simultaneously executing a partitioned multiplication operation.

In one embodiment, processor 102 is the UltraSPARC processor and computer system 100 (FIG. 1) is the UltraSPARCstation both of which are available from Sun Microsystems, Inc. of Mountain View, Calif. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

The FMUL8×16 Partitioned Multiplication Operation

Figure 18:
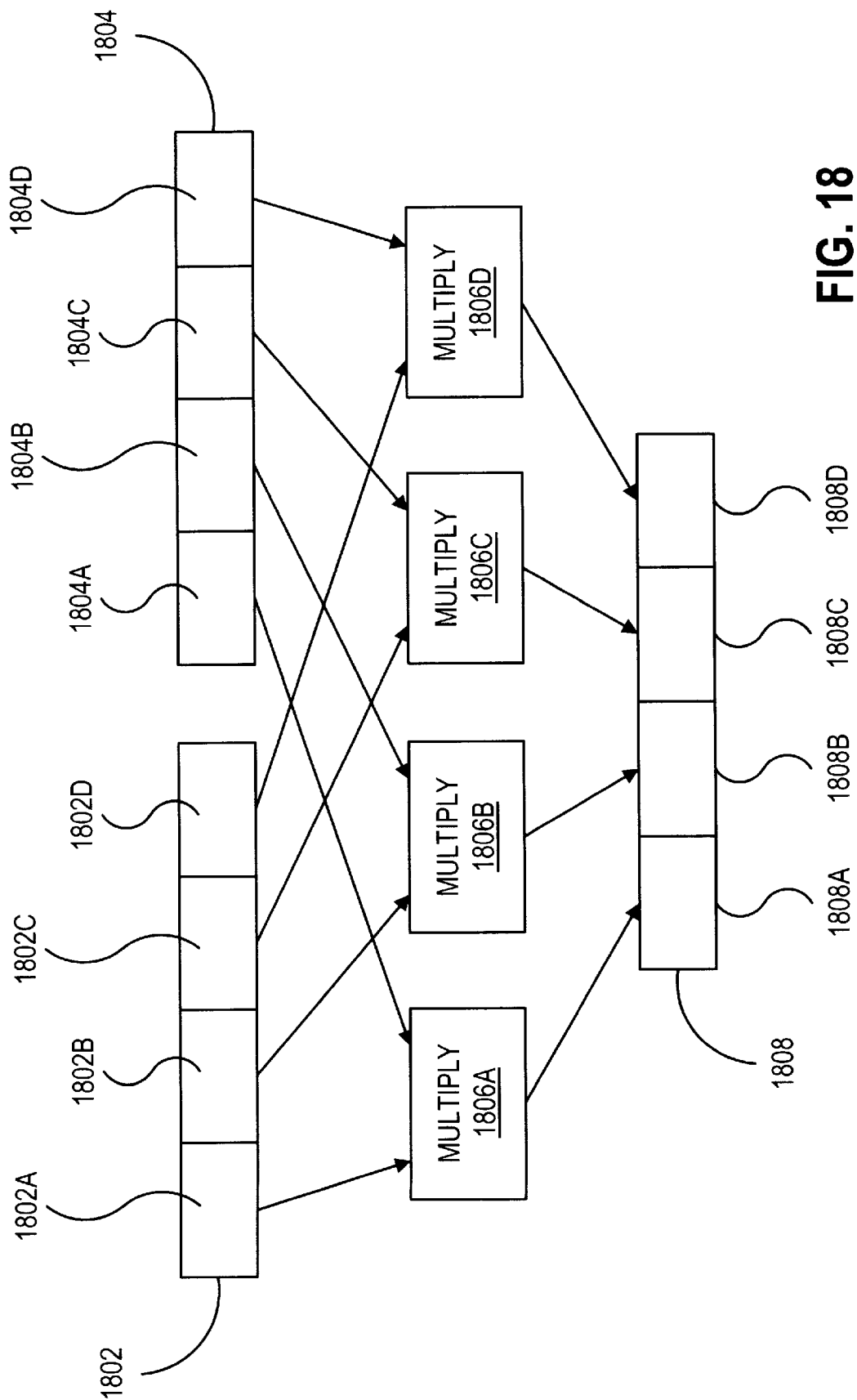
FIG. 18 is a block diagram illustrates the FMUL8×16 partitioned multiplication operation performed by the processor of FIG. 17.

As described above with respect to step 210 (FIG. 2), pixel weighter 308 multiplies each of components 306A–D of partitioned pixel word 306 by a respective one of components 312A–D of partitioned weight word 312 substantially simultaneously using a partitioned multiplication operation. Each of components 306A–D is an unsigned byte; partitioned pixel word 306 is therefore a 32-bit data word. Partitioned weight word 312 is a 64-bit data word and each of components 312A–D is a sixteen-bit fixed point number. Processor 102 performs a FMUL8×16 operation in which four unsigned bytes of a partitioned 32-bit data word are substantially simultaneously multiplied by respective ones of four sixteen-bit fixed point numbers of a 64-bit partitioned data word. The FMUL8×16 operation is illustrated in FIG. 18.

GRU 28 (FIG. 17) includes four multiplication units 1806A–D, which are directly analogous to one another. Each of multiplication units receives an operand from registers 1802 and 1804. The following description of multiplication unit 1806A is applicable to multiplication units 1806B–D as well. Multiplication unit 1806A receives as operands a partitioned unsigned byte 1802A of register 1802 and a partitioned sixteen-bit fixed point number 1804A of register 1804. Multiplication unit 1806A performs an arithmetic multiplication operation on the two operands and stores the product of the operands as a sixteen-bit fixed-point number 1808A of a partitioned register 1808. Thus, the result of the FMUL8×16 operation is register 1808 which includes four partitioned sixteen-bit fixed point numbers 1808A–D, which include data whose values are (i) the product of unsigned byte 1802A and sixteen-bit fixed point number 1804A, (ii) the product of unsigned byte 1802B and sixteen-bit fixed point number 1804B, (iii) the product of unsigned byte 1802C and sixteen-bit fixed point number 1804C, and (iv) the product of unsigned byte 1802D and sixteen-bit fixed point number 1804D. Since multiplication units 1806A–D operate in parallel, the result in register 1808 is produced in one instruction cycle.

Partitioned Multiplication of 16-bit Components with 16-bit Components: the FMUL16×16 Operation As described above with respect to step 510 (FIG. 5), multiplies each of components 606A–D (FIG. 6) by a respective one of components 706A–D (FIG. 7) substantially simultaneously. As further described above, each of components 606A–D and 706A–D is a sixteen-bit fixed point number. Processor 102 multiplies respective sixteen-bit fixed point numbers of a partitioned 64-bit data word with respective sixteen-bit fixed point numbers of a second partitioned 64-bit data word using a FMUL8SU×16 operation, a FMUL8UL×16 operation, and a FPADD16 operation which are described in U.S. patent application Ser. No. 08/563,158 by Vikas S. Deolaliker entitled "Accumulation Buffer Method and Apparatus for Graphical Image Processing" and filed Nov. 27, 1995, and that description is incorporated herein in its entirety by reference. The FMUL8SUx16, FMUL8ULx16, and FPADD16 operations are combined to form a virtual FMUL16x16 operation execution of which performs four multiplication operations substantially simultaneously in three instruction cycles. The FPADD16 operation is a partitioned addition operation and is additionally used for purposes other than partitioned multiplication of multiple sixteen-bit fixed point operands. The FPADD16 operation is therefore briefly described below for completeness.

Transposition of Partitioned Data Words

Figure 19:
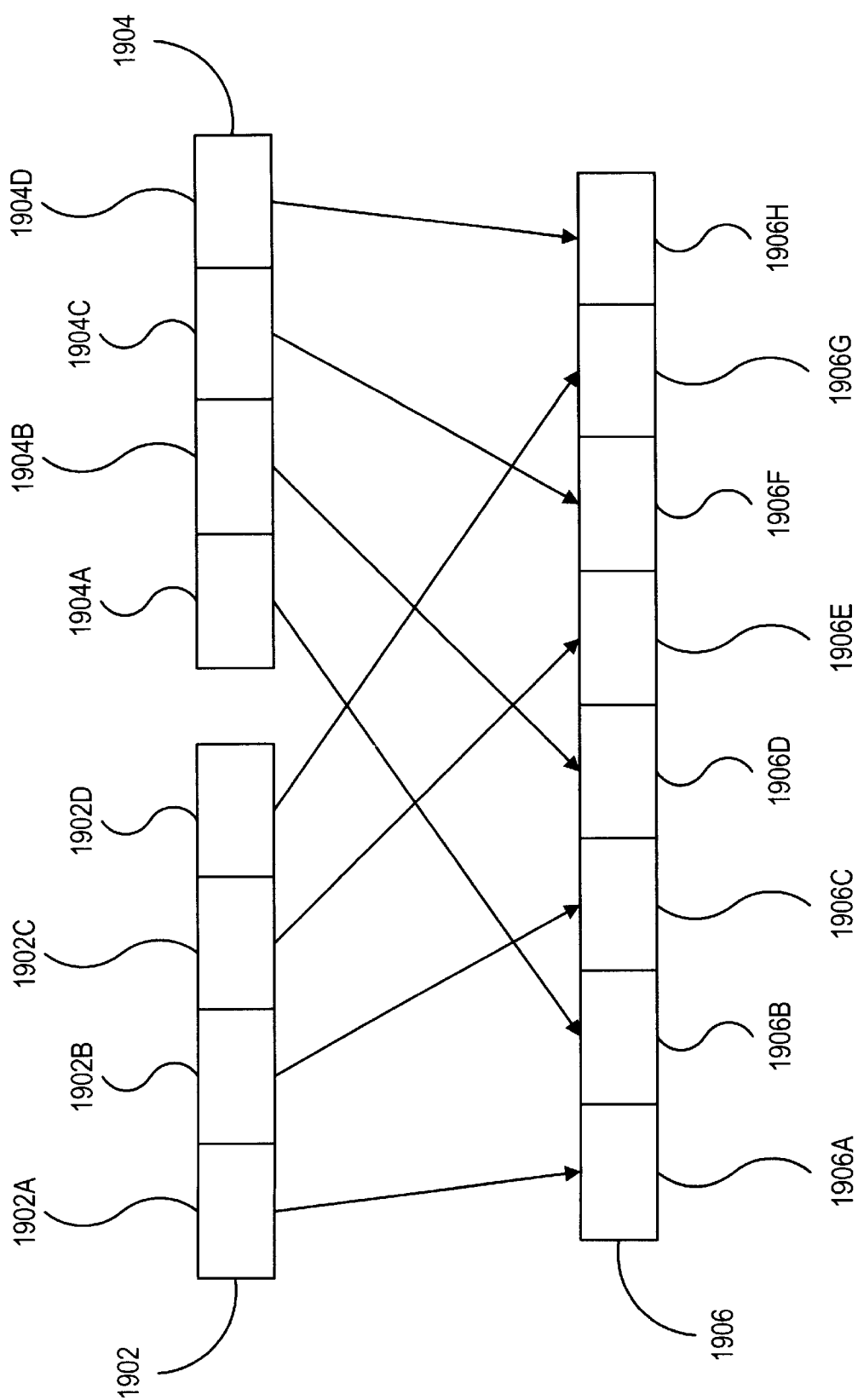
FIG. 19 is a block diagram illustrating the PMERGE operation performed by the processor of FIG. 17.

As described above with respect to step 214, transposer 322 transposes partitioned data words 314–320 to form partitioned data words 324–330. Transposer 322 uses a PMERGE operation which is carried out by processor 102 and which is illustrated in FIG. 19. Register 1902 is 32-bits in length and includes partitioned components 1902A–D, each of which is eight bits in length. Similarly, register 1904 is 32-bits in length and includes partitioned components 1904A–D, each of which is eight bits in length. The PMERGE operation interleaves respective components of registers 1902 and 1904 into a register 1906 as shown. Register 1906 is 64 bits in length and includes partitioned components 1906A–H.

Figure 20A:
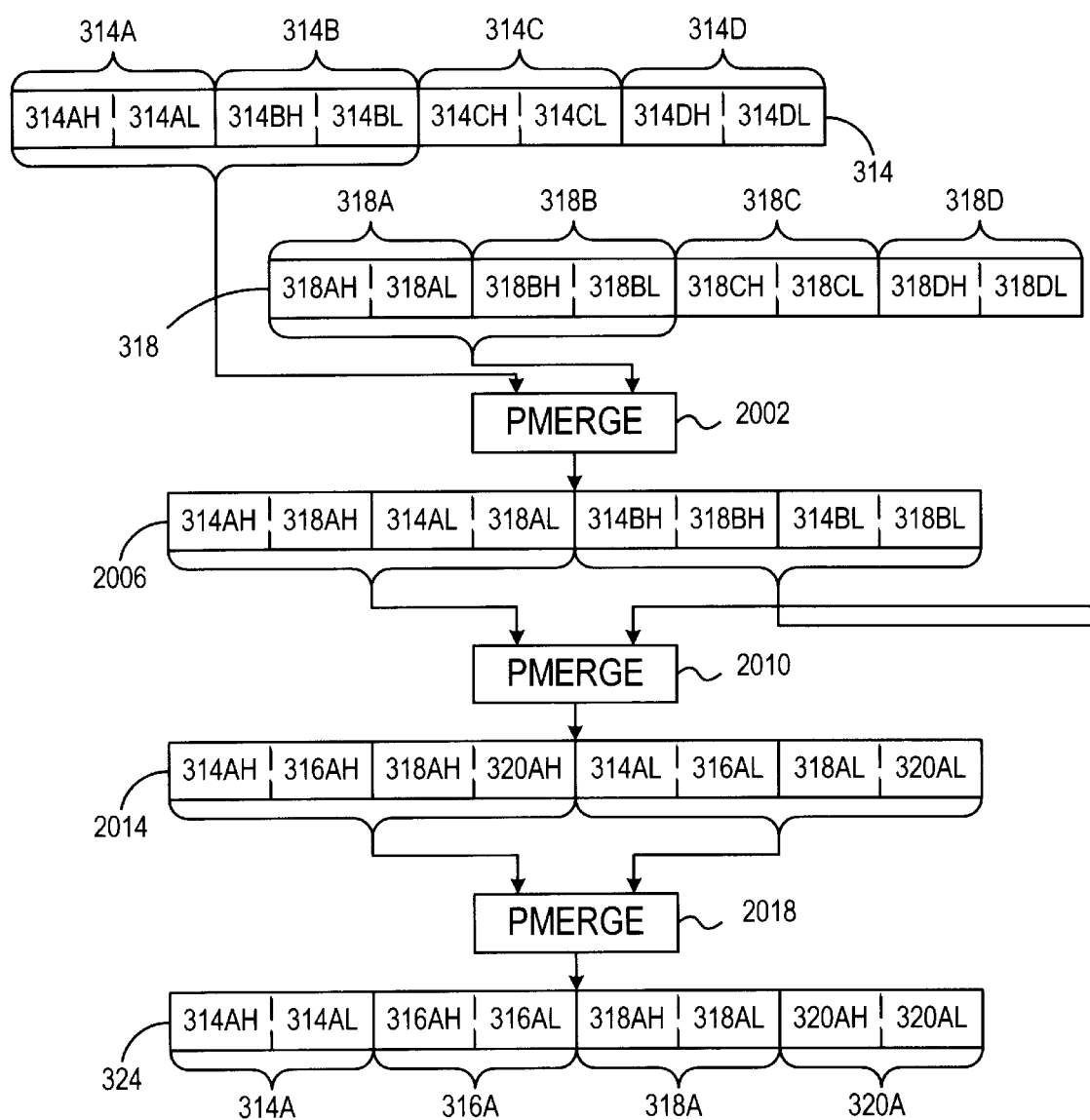
FIG. 20 is a block diagram illustrating the transposition of data words having multiple components of a single respective pixel to data words have a single component of each of a number of pixels.
Figures 20, 20B:
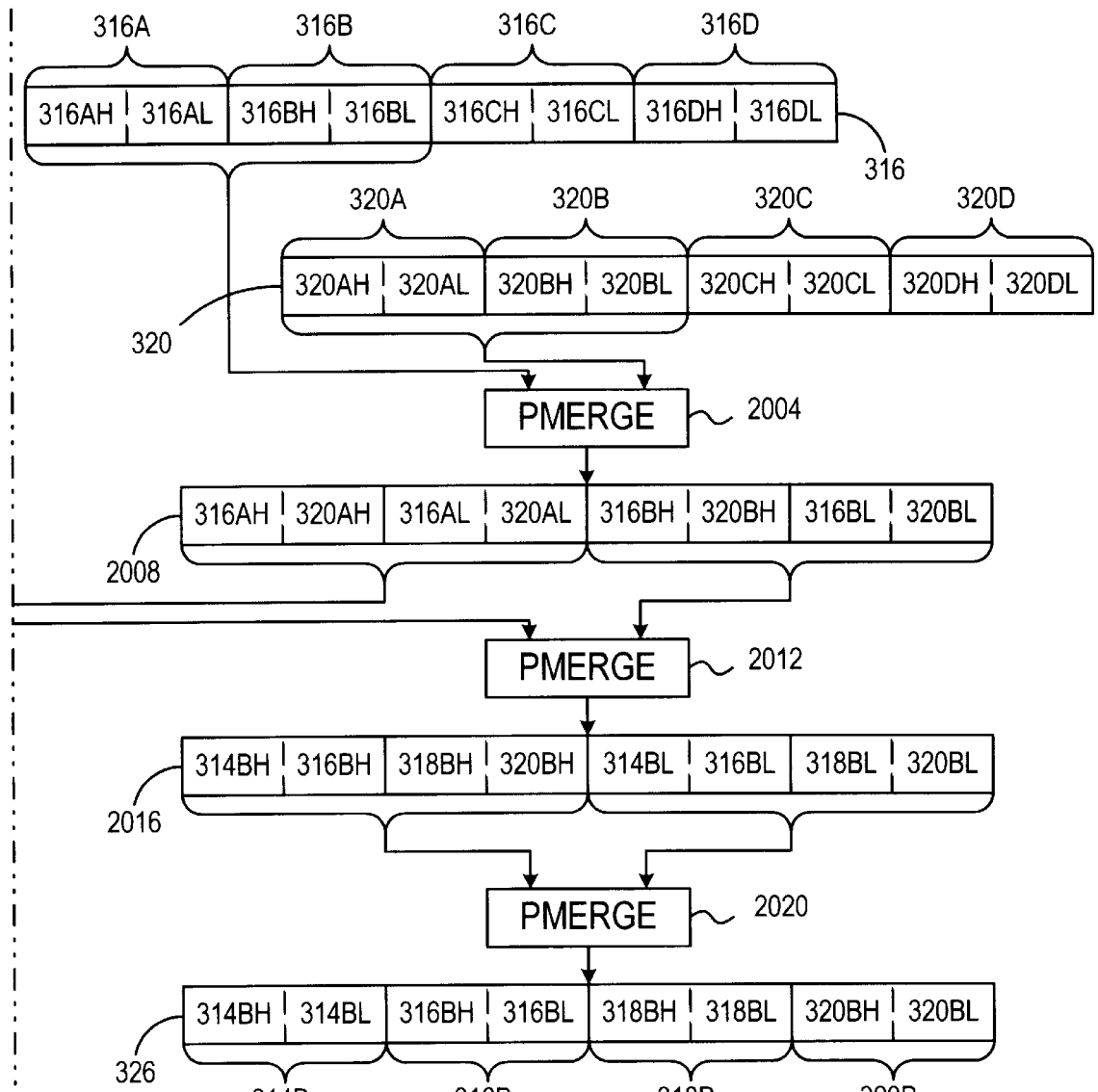

Transposition by transposer 322 using the PMERGE operation is shown in FIG. 20. Each of components 314A–D, 316A–D, 318A–D, and 320A–D is a sixteen-bit fixed point number. In FIG. 20, 314AH refers to the upper eight bits of component 314A and 314AL refers to the lower eight bits of component 314. Similar notation is used for other components shown in FIG. 20. PMERGE operation 2002 interleaves upper and lower bytes of components 341A and 314B with upper and lower bytes of components 318A and 318B to produce partitioned data word 2006. PMERGE operation 2004 interleaves upper and lower bytes of components 316A and 316B with upper and lower bytes of components 320A and 320B to produce partitioned data word 2008. PMERGE operation 2010 interleaves the upper 32-bits of partitioned data word 2006, which includes upper and lower bytes of components 314A and 318A, with the upper 32 bits of partitioned data word 2008, which includes upper and lower bytes of components 316A and 320A, to produce partitioned data word 2014. The upper 32 bits of partitioned data word 2014 includes the upper bytes of components 314A, 316A, 318A, and 320A; and the lower 32 bits of partitioned data word 2014 includes the lower bytes of components 314A, 316A, 318A, and 320A. PMERGE operation 2018 interleaves the upper four bytes of partitioned data word 2014 with the lower four bytes of data word 2014 to form partitioned data word 324. As shown in FIG. 20, the eight bytes of partitioned data word 324 are the upper and lower bytes of component 314A, the upper and lower bytes of component 316A, the upper and lower bytes of component 318A, and the upper and lower bytes of component 320A.

PMERGE operations 2012 and 2020 are used in a manner analogous to that described above with respect to PMERGE operations 2010 and 2018 to produce partitioned data word 326. As shown in FIG. 20, the eight bytes of partitioned data word 326 are the upper and lower bytes of component 314B, the upper and lower bytes of component 3161, the upper and lower bytes of component 318B, and the upper and lower bytes of component 320B. Transposer 322 (FIG. 3) transposes components 314C–D, 316C–D, 318C–D, and 320C–D in a manner that is directly analogous to that described above and shown in FIG. 20.

The FPADD16 Operation

Figure 21:
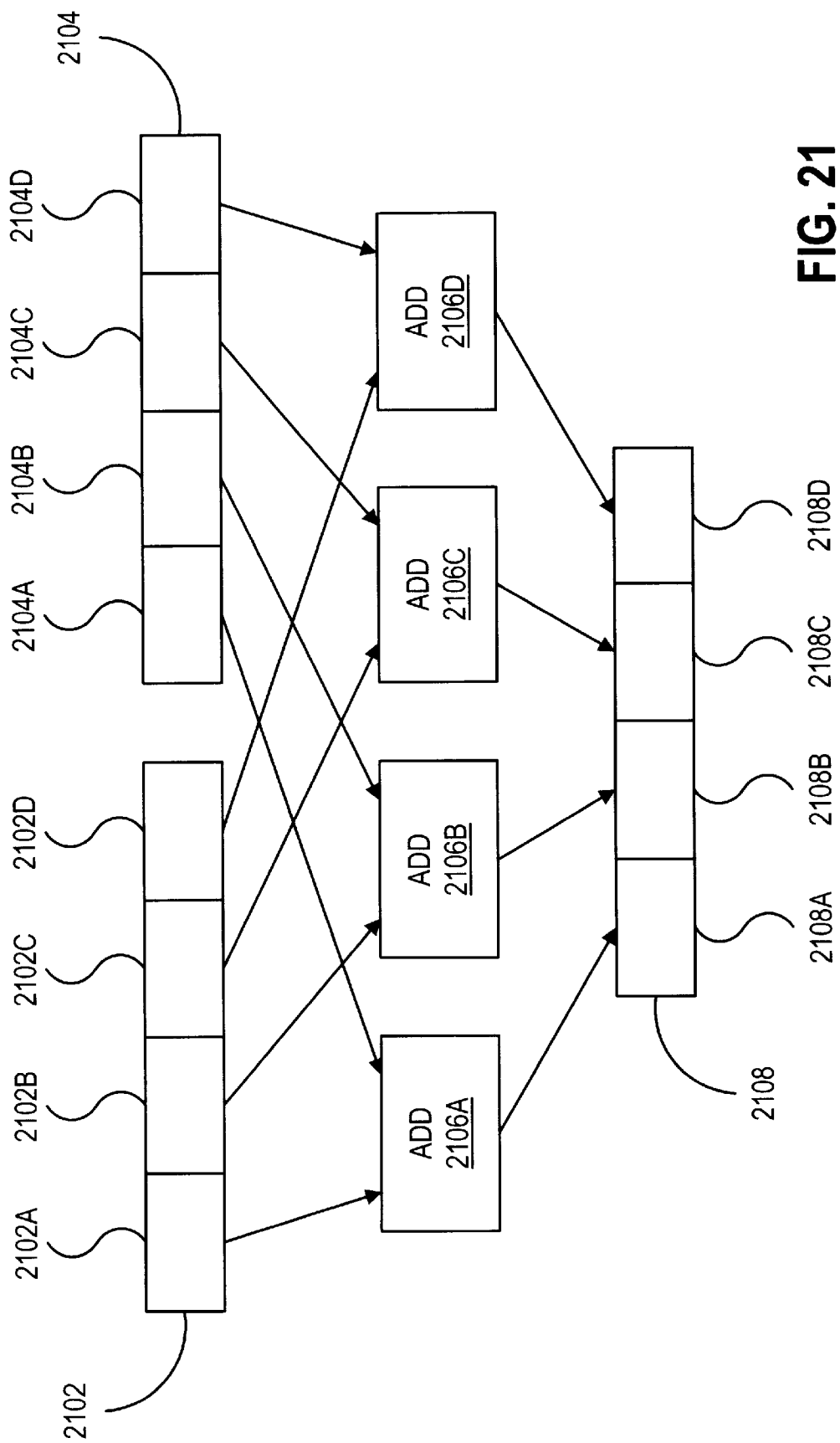
FIG. 21 is a block diagram illustrating the FPADD16 partitioned operation performed by the processor of FIG. 17.

As described above with respect to step 216 (FIG. 2), accumulator 332 (FIG. 3) of image processor 110 sums respective components of partitioned data words 324–330 substantially simultaneously in a partitioned addition operation. Each of the components of partitioned data words 324–330 is a sixteen-bit fixed point number. Processor 102 (FIG. 17) performs a partitioned FPADD16 operation which is illustrated in FIG. 21. Register 2102 includes partitioned components 2102A–D, each of which is a sixteen-bit fixed point number. Similarly, register 2104 includes partitioned components 2104A–D, each of which is a sixteen-bit fixed point number. GRU 28 (FIG. 17) includes four addition units 2106A–D (FIG. 21) which are analogous to one another. The following description of addition unit 2106A is applicable to addition units 210-6B–D as well.

Addition unit 2106A retrieves component 2102A from register 2102 and component 2104A from register 2104 and produces as component 2108A of register 2108 the arithmetic sum of components 2102A and 2104A. Addition units 2106A–D operate substantially simultaneously to produce in register 2108 partitioned sums of respective components of registers 2102 and 2104 in a single instruction cycle.

The FMUL8x16AU and FMUL8x16AL Operations

Figure 22:
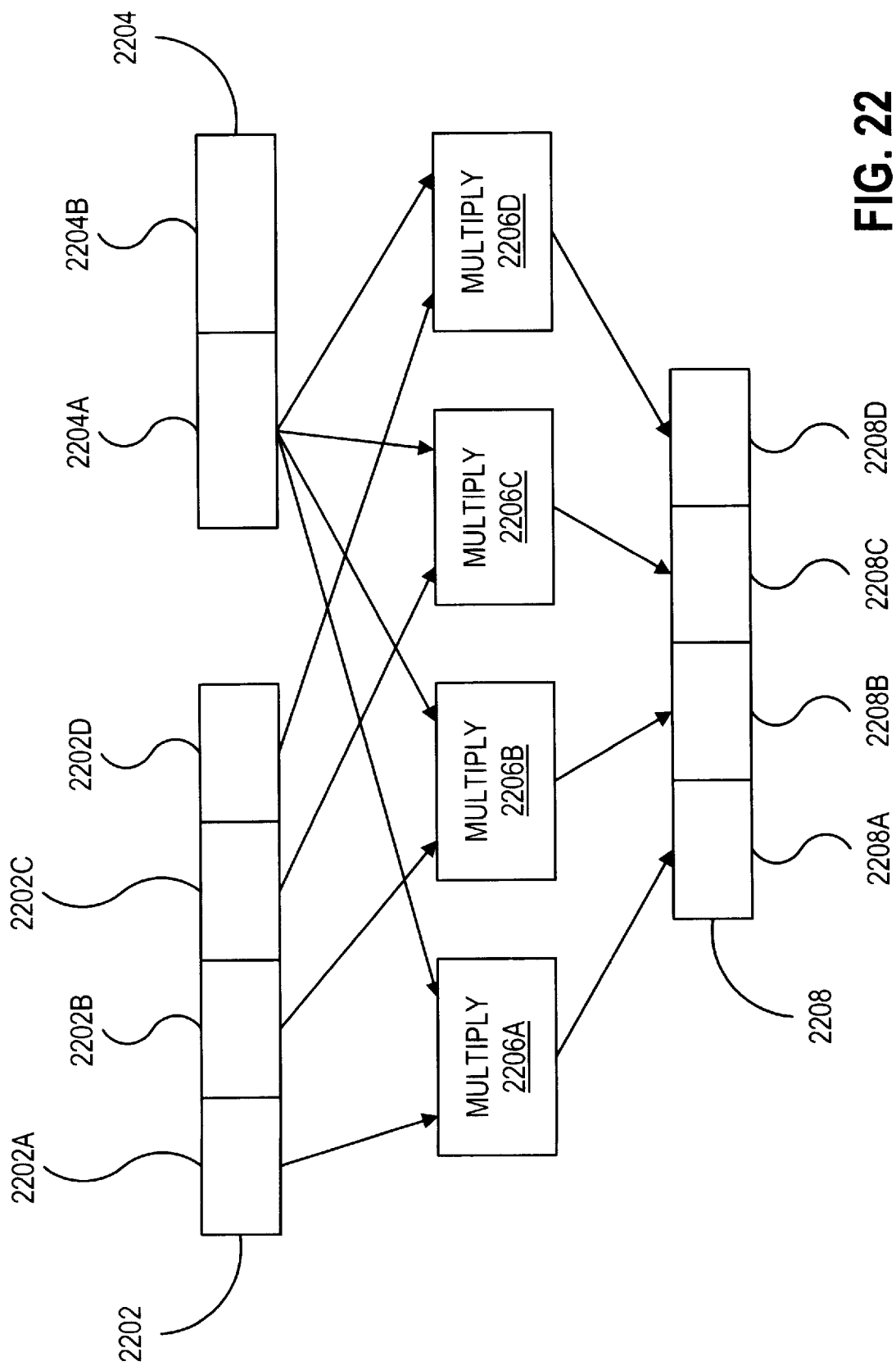
FIG. 22 is a block diagram illustrating the FMUL8×16AU partitioned multiplication operation performed by the processor of FIG. 17.

As described above with respect to step 808 (FIG. 8), pixel weighter 908 (FIG. 9) of image processor 110 multiplies each of components 906A–D of partitioned pixel word 906 by a selected one of components 912A–D of partitioned weight word 912 substantially simultaneously in a partitioned multiplication operation. Partitioned weight word 912 is a 64-bit data word and each of components 912A–D is a sixteen-bit fixed point number. Processor 102 (FIG. 17) performs a partitioned FMUL8x16AU operation which is illustrated in FIG. 22. Register 2202 includes partitioned components 2202A–D, each of which is an unsigned byte. Register 2204 includes partitioned components 2204A–B, each of which is a sixteen-bit fixed point number. The upper and lower 32 bits of partitioned weight word 912 (FIG. 9) are separately addressable by image processor 110. Therefore, register 2204 (FIG. 22) can be either the upper or the lower 32 bits of partitioned weight word 912 (FIG. 9) when performing step 808 (FIG. 8). GRU 28 (FIG. 17) includes four multiplication units 2206A–D (FIG. 22) which are analogous to one another and which are directly analogous to multiplication units 1806A–D. The FMUL8x16AU operation is generally analogous to the FMUL8x16 operation described above with the exception that the same sixteen-bit fixed point number, i.e., component 2204A which is the upper sixteen bits of register 2204, is multiplied by each of components 2204A–D. Multiplication units 2206A–D operate substantially simultaneously to produce in register 2208 partitioned products of component 2204A and respective components of register 2202 in a single instruction cycle.

Figure 23:
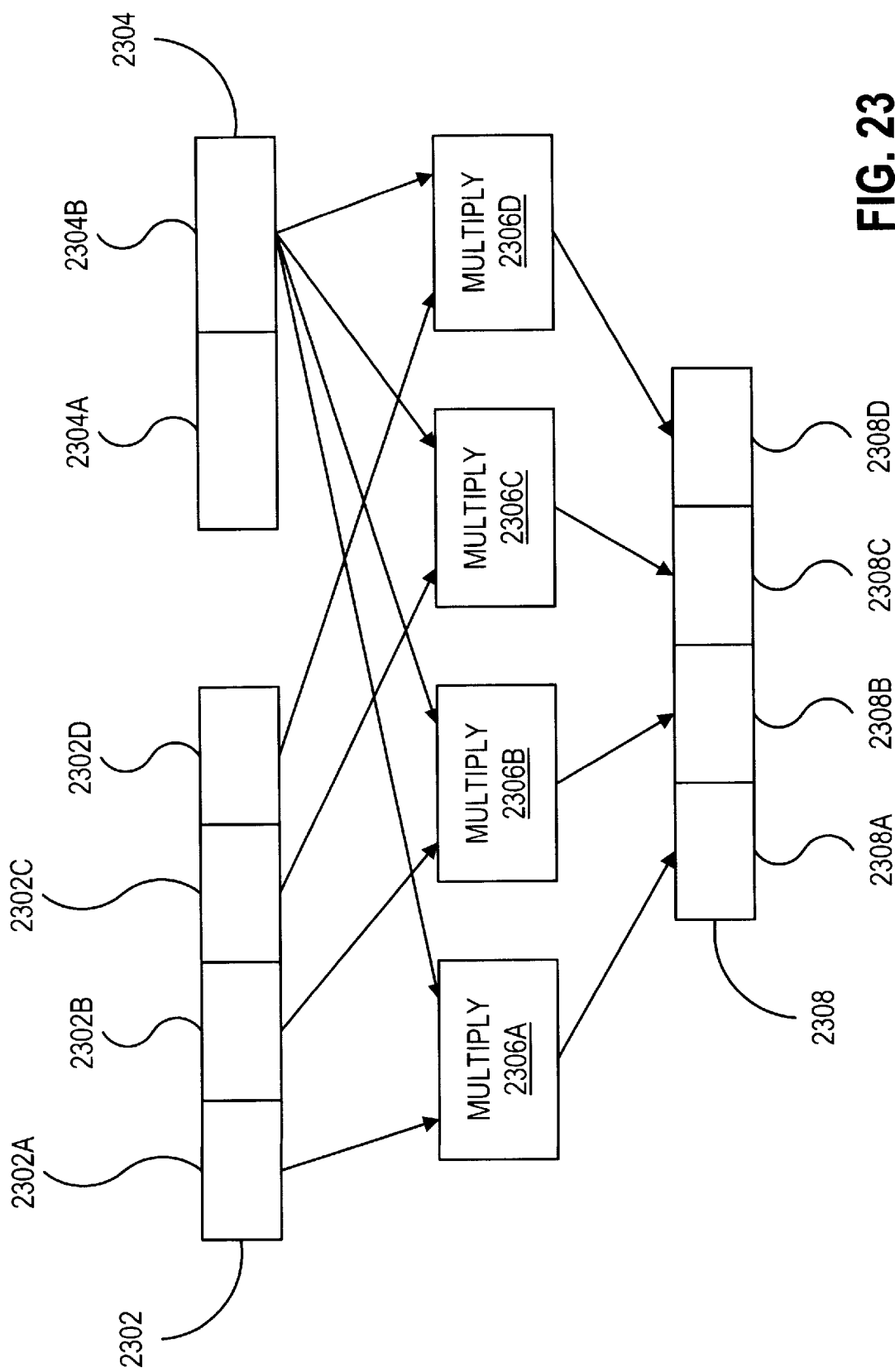
FIG. 23 is a block diagram illustrating the FMUL8×16AL partitioned multiplication operation performed by the processor of FIG. 17.

Processor 102 (FIG. 17) also performs a partitioned FMUL8x16AL operation which is illustrated in FIG. 23. Register 2302 includes partitioned components 2302A–D, each of which is an unsigned byte. Register 2304 includes partitioned components 2304A–B, each of which is a sixteen-bit fixed point number. Register 2304 can be either the upper or the lower 32 bits of partitioned weight word 912 (FIG. 9) when performing step 808 (FIG. 8). GRU 28 (FIG. 17) includes four multiplication units 23206A–D (FIG. 23) which are analogous to one another and which are directly analogous to multiplication units 1806A–D and 2206A–D. The FMUL8x16AL operation is generally analogous to the FMUL8x16 and FMUL8x16AU operations described above with the exception that the same sixteen-bit fixed point number, i.e., component 2304B which is the lower sixteen bits of register 2304, is multiplied by each of components 2304A–D. Multiplication units 2306A–D operate substantially simultaneously to produce in register 2308 partitioned products of component 2304B and respective components of register 2302 in a single instruction cycle.

The FPADD16 Operation

As described above with respect to step 216 (FIG. 2), accumulator 332 (FIG. 3) of image processor 110 sums respective components of partitioned data words 324–330 substantially simultaneously in a partitioned addition operation. Processor 102 (FIG. 17) performs a partitioned FPADD16 operation which is illustrated in FIG. 21. Register 2102 includes partitioned components 2102A–D, each of which is a sixteen-bit fixed point number. Similarly, register 2104 includes partitioned components 2104A–D, each of which is a sixteen-bit fixed point number. GRU 28 (FIG. 17) includes four addition units 2106A–D (FIG. 21) which are analogous to one another. The following description of addition unit 2106A is applicable to addition units 2106B–D as well.

Addition unit 2106A retrieves component 2102A from register 2102 and component 2104A from register 2104 and produces as component 2108A of register 2108 the arithmetic sum of components 2102A and 2104A. Addition units 2106A–D operate substantially simultaneously to produce in register 2108 partitioned sums of respective components of registers 2102 and 2104 in a single instruction cycle.

The above description is illustrative only and is not limiting. The present invention is limited only by the claims which follow.

What is claimed is:

1. A method for mapping a graphical object, represented in a memory of a computer system, to a destination graphical image buffer, stored in the memory, the method comprising:
   (a) determining whole and fractional portions of at least one subject coordinates of a subject pixel of the destination graphical image buffer in an address space of the graphical object;
   (b) selecting from the graphical object at least two object pixels which correspond to the subject coordinates of the subject pixel and each of which has a color;
   (c) selecting at least one coefficients from a table, stored in the memory, of predetermined coefficients according to the fractional portions of at least one of the subject coordinates of the subject pixel; and
   (d) calculating a subject color of the subject pixel in accordance with the at least two object pixels and respective ones of the coefficients, wherein the step of calculating comprises:
       (i) storing each of the at least two object pixels as partitioned components of a first single data word in the memory;
       (ii) storing each of the at least one coefficients as partitioned components of a second single data word in the memory; and
       (iii) multiplying each of the at least two object pixels by a respective one of the coefficients in a partitioned multiplication operation.

2. The method of claim 1 wherein the step of calculating further comprises:
   (iv) storing as respective partitioned components of a third single data word in the memory at least two products of respective ones of the at least two object pixels and respective ones of the coefficients.

3. The method of claim 2 wherein the step of calculating further comprises:
   (v) summing the respective partitioned components of the third single data word to produce the subject color of the subject pixel.

4. The method of claim 3 further comprising:
   repeating steps (a) through (d) to thereby calculate a second subject color, distinct from the first-mentioned subject color, of a second subject pixel, distinct from the first-mentioned subject pixel;
   wherein step (d)(v) of calculating the first subject color of the first subject pixel is performed substantially simultaneously with step (d)(v) of calculating the second subject color of the second subject pixel in a single summing step.

5. The method of claim 4 wherein the single summing step comprises:
   transposing the first third single data word, formed in step (d)(iv) of calculating the first subject color of the first subject pixel, and the second third single data word, formed in step (d)(iv) of calculating the second subject color of the second subject pixel, to form at least two intermediate data words, each of which has at least two partitioned components, wherein a first component of each of the intermediate data words is a respective component of the first third single data word and further wherein a second component of each of the intermediate data words is a respective component of the second third single data word; and
   summing the first components of the intermediate data words while substantially summing the second components of the intermediate data words using a partitioned addition operation.

6. A computer program product which includes a computer usable medium having computable readable code embodied therein for mapping a graphical object represented in a memory of a computer system to a destination graphical image buffer stored in the memory, the computer readable code comprising:
   (a) a coordinate parser which is configured to determine whole and fractional portions of at least one subject coordinates of a subject pixel of the destination graphical image buffer in an address space of the graphical object;
   (b) a pixel retrieving module which is configured to select from the graphical object at least two object pixels which correspond to the subject coordinates of the subject pixel and each of which has a color;
   (c) a table lookup module which is operatively coupled to the coordinate parser and the pixel retrieving module and which is configured to select at least one coefficients from a table, stored in the memory, of predetermined coefficients according to the fractional portions of at least one of the subject coordinates of the subject pixel; and
   (d) a composite color builder operatively coupled to the table lookup module and configured to form a subject color of the subject pixel in accordance with the at least two object pixels and respective ones of the coefficients, wherein the composite color builder comprises:
       (i) a pixel word builder configured to store each of the at least two object pixels as partitioned components of a first single data word in the memory;
       (ii) a coefficient word builder configured to store each of the at least one coefficients as partitioned components of a second single data word in the memory; and (iii) a partitioned processing module operatively coupled to the pixel word builder and the coefficient word builder and configured to multiply each of the at least two object pixels by a respective one of the coefficients in a partitioned multiplication operation.

7. The computer program product of claim 6 wherein the composite color builder further comprises:

(iv) a product word builder operatively coupled to the partitioned processing module and configured to store as respective partitioned components of a third single data word in the memory at least two products of respective ones of the at least two object pixels and respective ones of the coefficients.

8. The computer program product of claim 7 wherein the composite color builder further comprises:

(v) a color composing module operatively coupled to the product word builder and configured to sum the respective partitioned components of the third single data word to produce the subject color of the subject pixel.

9. The computer program product of claim 8 wherein the color composing module is configured to sum partitioned components of a second subject pixel, different from the first-mentioned subject pixel, while summing the respective partitioned components of the third single data word substantially simultaneously.

10. A system for distributing code (i) stored on a computer-readable medium, (ii) executable by a computer, and (iii) including at least one module, each of which is configured to carry out at least one function to be executed by the computer and which collectively are configured to map a graphical object, represented in a memory of a computer system, to a destination graphical image buffer, stored in the memory, the system comprising:

(a) a coordinate parser configured to determine whole and fractional portions of at least one subject coordinates of a subject pixel of the destination graphical image buffer in an address space of the graphical object;

(b) a pixel retrieving module configured to select from the graphical object at least two object pixels which correspond to the subject coordinates of the subject pixel and each of which has a color;

(c) a table lookup module operatively coupled to the coordinate parser and the pixel retrieving module and configured to select at least one coefficients from a table, stored in the memory, of predetermined coefficients according to the fractional portions of at least one of the subject coordinates of the subject pixel; and (d) a composite color builder operatively coupled to the table lookup module and configured to form a subject color of the subject pixel in accordance with the at least two object pixels and respective ones of the coefficients, wherein the composite color builder comprises:

(i) a pixel word builder configured to store each of the at least two object pixels as partitioned components of a first single data word in the memory;

(ii) a coefficient word builder configured to store each of the at least one coefficients as partitioned components of a second single data word in the memory; and (iii) a partitioned processing module operatively coupled to the pixel word builder and the coefficient word builder and configured to multiply each of the at least two object pixels by a respective one of the coefficients in a partitioned multiplication operation.

11. The system of claim 10 wherein the composite color builder further comprises:

(iv) a product word builder operatively coupled to the partitioned processing module and configured to store as respective partitioned components of a third single data word in the memory at least two products of respective ones of the at least two object pixels and respective ones of the coefficients.

12. The system of claim 11 wherein the composite color builder further comprises:

(v) a color composing module operatively coupled to the product word builder and configured to sum the respective partitioned components of the third single data word to produce the subject color of the subject pixel.

13. The system of claim 12 wherein the color composing module is configured to sum partitioned components of a second subject pixel, different from the first-mentioned subject pixel, while summing the respective partitioned components of the third single data word substantially simultaneously.

14. An image processor for mapping a graphical object, represented in a memory of a computer system, to a destination graphical image buffer, stored in the memory, the image processor comprising:

(a) a coordinate parser configured to determine whole and fractional portions of at least one subject coordinates of a subject pixel of the destination graphical image buffer in an address space of the graphical object;

(b) a pixel retrieving module configured to select from the graphical object at least two object pixels which correspond to the subject coordinates of the subject pixel and each of which has a color;

(c) a table lookup module operatively coupled to the coordinate parser and the pixel retrieving module and configured to select at least one coefficients from a table, stored in the memory, of predetermined coefficients according to the fractional portions of at least one of the subject coordinates of the subject pixel; and (d) a composite color builder operatively coupled to the table lookup module and configured to form a subject color of the subject pixel in accordance with the at least two object pixels and respective ones of the coefficients, wherein the composite color builder comprises:

(i) a pixel word builder configured to store each of the at least two object pixels as partitioned components of a first single data word in the memory;

(ii) a coefficient word builder configured to store each of the at least one coefficients as partitioned components of a second single data word in the memory; and (iii) a partitioned processing module operatively coupled to the pixel word builder and the coefficient word builder and configured to multiply each of the at least two object pixels by a respective one of the coefficients in a partitioned multiplication operation.

15. The image processor of claim 14 wherein the composite color builder further comprises:

(iv) a product word builder which is operatively coupled to the partitioned processing module and configured to store as respective partitioned components of a third single data word in the memory at least two products of respective ones of the at least two object pixels and respective ones of the coefficients.

16. The image processor of claim 15 wherein the composite color builder further comprises:

(v) a color composing module operatively coupled to the product word builder and configured to sum the respective partitioned components of the third single data word to produce the subject color of the subject pixel.

17. The image processor of claim 16 wherein the color composing module is configured to sum partitioned components of a second subject pixel, different from the first-mentioned subject pixel, while summing the respective partitioned components of the third single data word substantially simultaneously.

18. A computer system comprising:

a computer processor;

a memory operatively coupled to the computer processor; and a computer process which executes in the computer processor from the memory and which includes:
  (a) a coordinate parser configured to determine whole and fractional portions of at least one subject coordinates of a subject pixel of a destination graphical image buffer stored in the memory in an address space of a graphical object stored in the memory;
  (b) a pixel retrieving module configured to select from the graphical object at least two object pixels which correspond to the subject coordinates of the subject pixel and each of which has a color;
  (c) a table lookup module operatively coupled to the coordinate parser and the pixel retrieving module and configured to select at least one coefficients from a table, stored in the memory, of predetermined coefficients according to the fractional portions of at least one of the subject coordinates of the subject pixel; and
  (d) a composite color builder operatively coupled to the table lookup module and configured to form a subject color of the subject pixel in accordance with the at least two object pixels and respective ones of the coefficients, wherein the composite color builder comprises:
    (i) a pixel word builder configured to store each of the at least two object pixels as partitioned components of a first single data word in the memory;
    (ii) a coefficient word builder configured to store each of the at least one coefficients as partitioned components of a second single data word in the memory; and
    (iii) a partitioned processing module operatively coupled to the pixel word builder and the coefficient word builder and configured to multiply each of the at least two object pixels by a respective one of the coefficients in a partitioned multiplication operation.

19. The system of claim 18 wherein the composite color builder further comprises:
  (iv) a product word builder operatively coupled to the partitioned processing module and configured to store as respective partitioned components of a third single data word in the memory at least two products of respective ones of the at least two object pixels and respective ones of the coefficients.

20. The system of claim 19 wherein the composite color builder further comprises:
  (v) a color composing module operatively coupled to the product word builder and configured to sum the respective partitioned components of the third single data word to produce the subject color of the subject pixel.

21. The system of claim 20 wherein the color composing module is configured to sum partitioned components of a second subject pixel, different from the first-mentioned subject pixel, while summing the respective partitioned components of the third single data word substantially simultaneously.

* * * * *